April 13, 1926. 1,580,505
C. L. LEE ET AL
METAL FOLDING MACHINE
Filed May 9, 1924 32 Sheets-Sheet 1
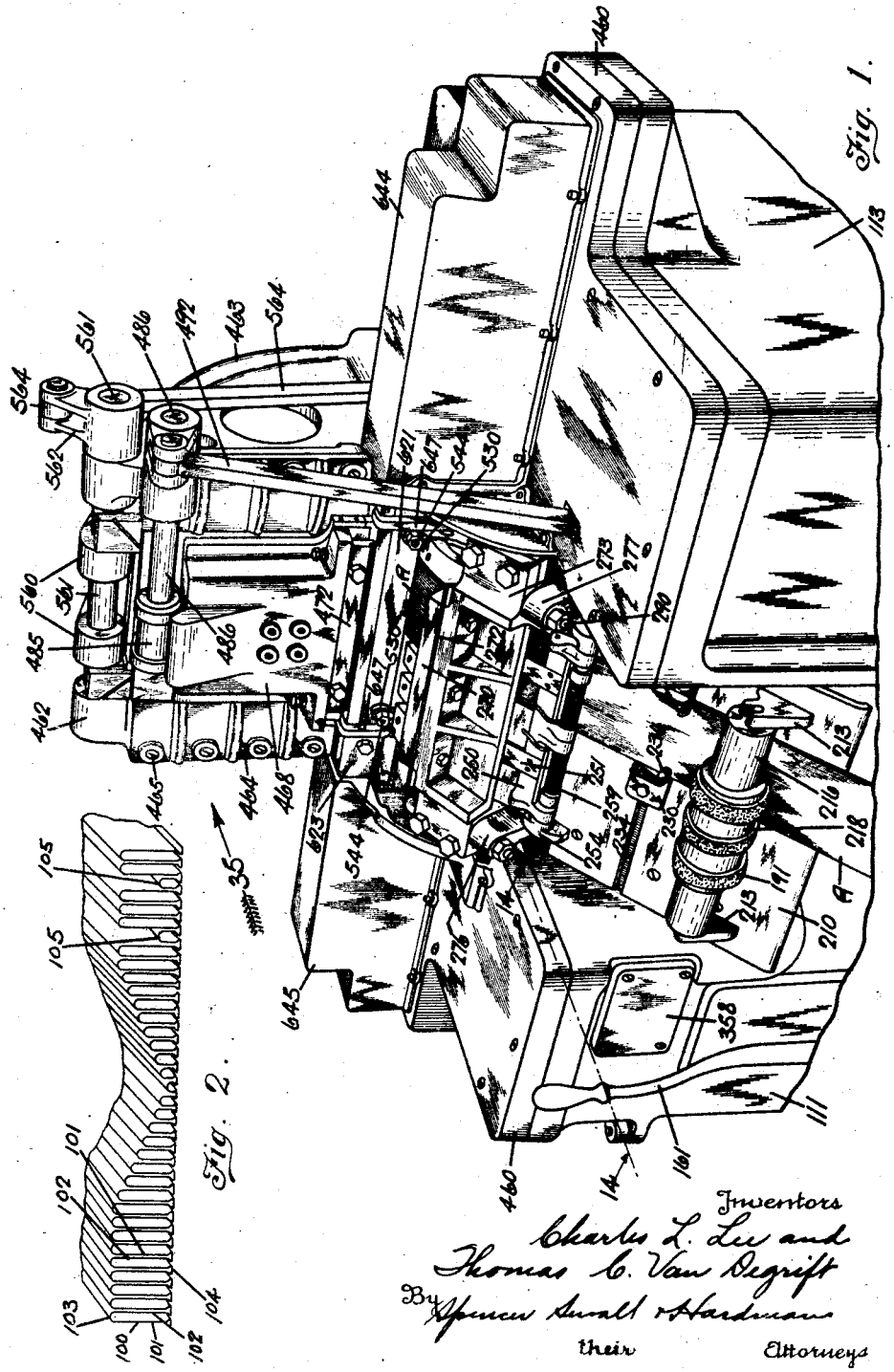

April 13, 1926. 1,580,505
C. L. LEE ET AL
METAL FOLDING MACHINE
Filed May 9, 1924 32 Sheets-Sheet 2

April 13, 1926. 1,580,505
C. L. LEE ET AL
METAL FOLDING MACHINE
Filed May 9, 1924 32 Sheets-Sheet 3

Inventors
Charles L. Lee and
Thomas C. Van Degrift
By Spencer, Sewall & Hardman
their Attorneys April 13, 1926.
C. L. LEE ET AL
1,580,505
METAL FOLDING MACHINE
Filed May 9, 1924     32 Sheets-Sheet 4
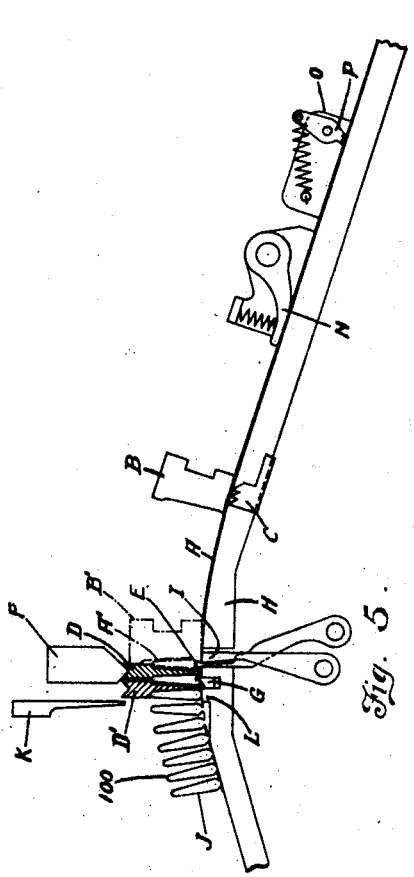
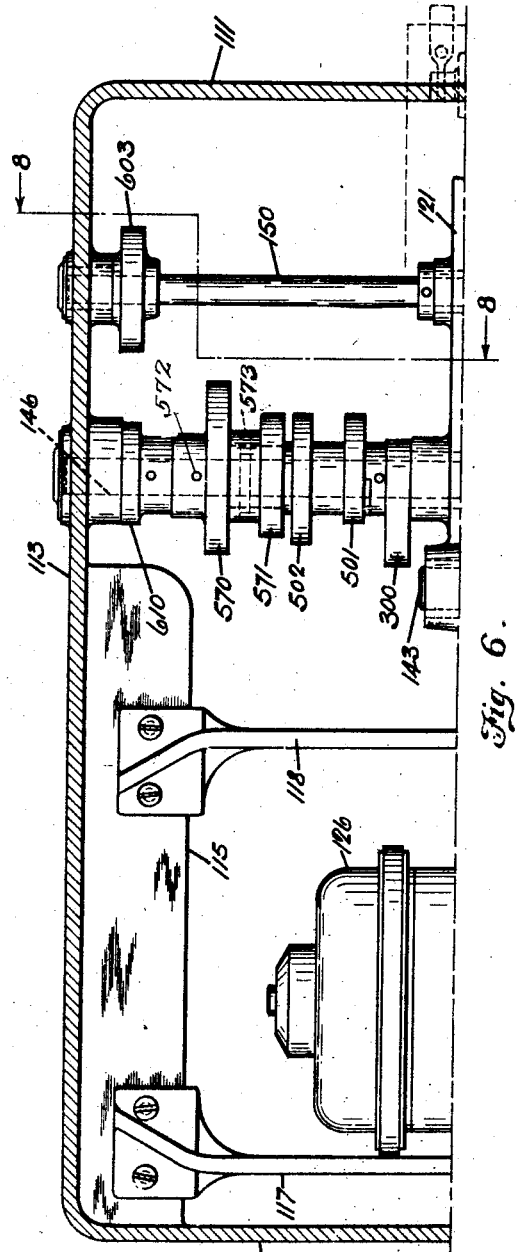

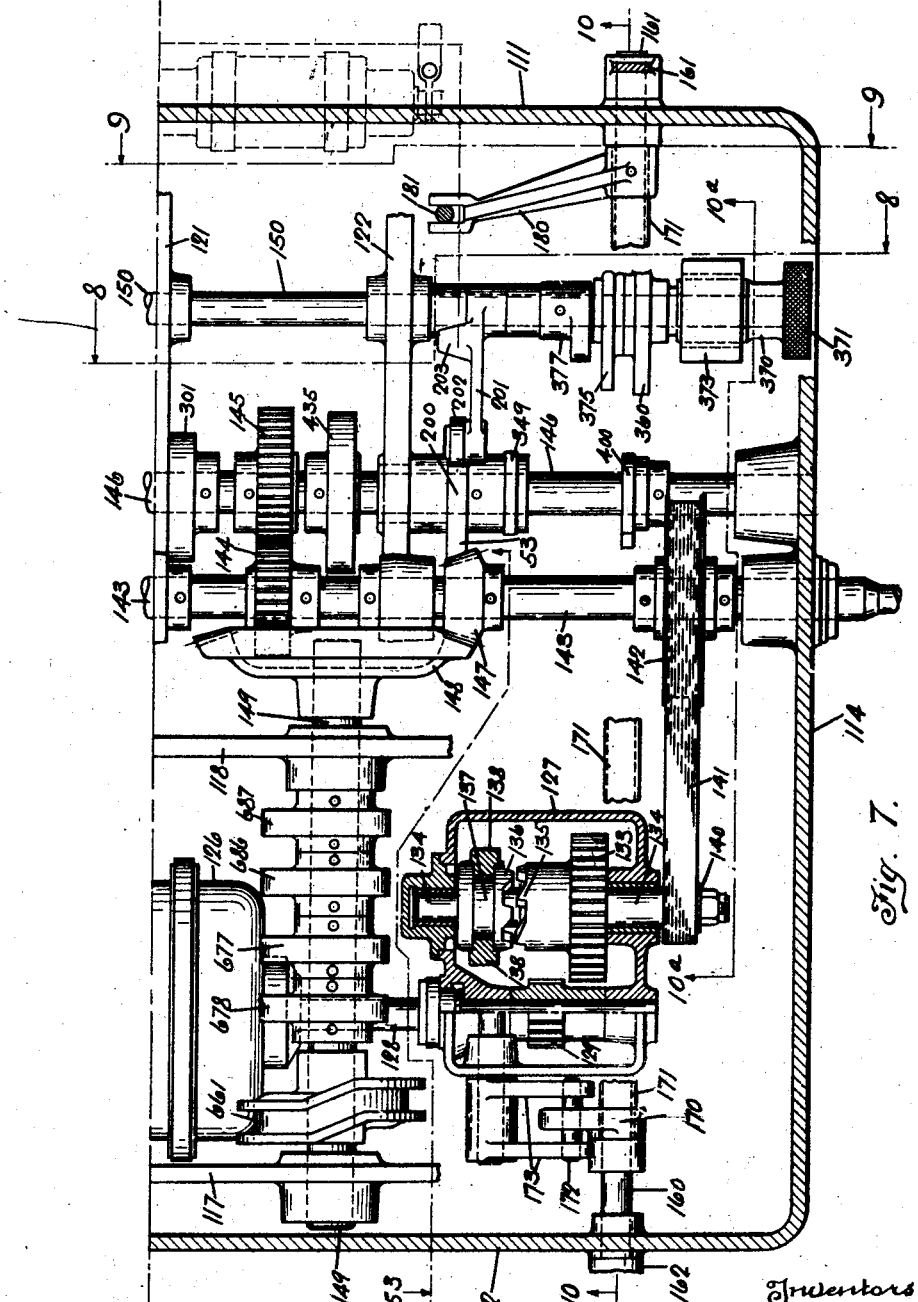

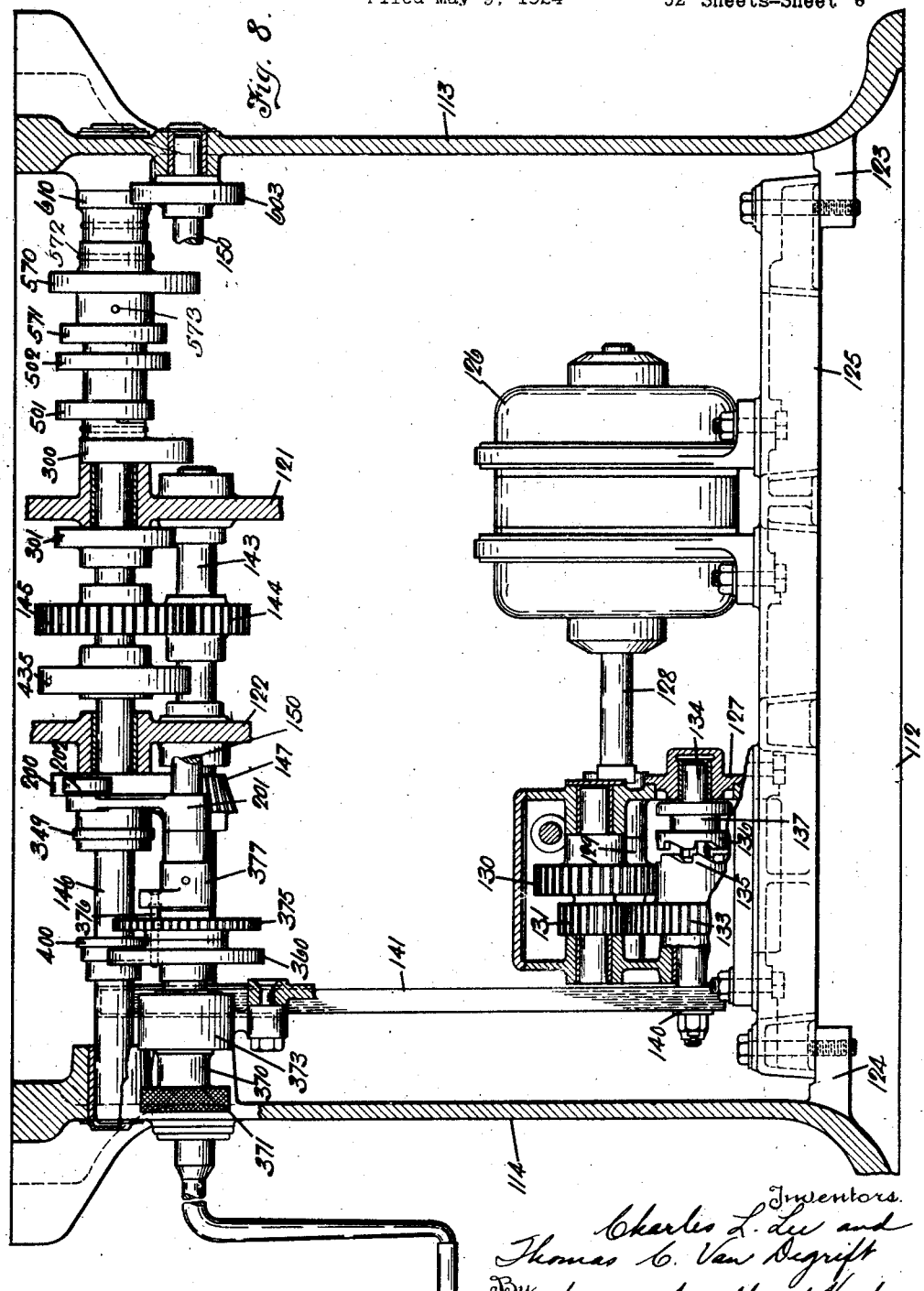

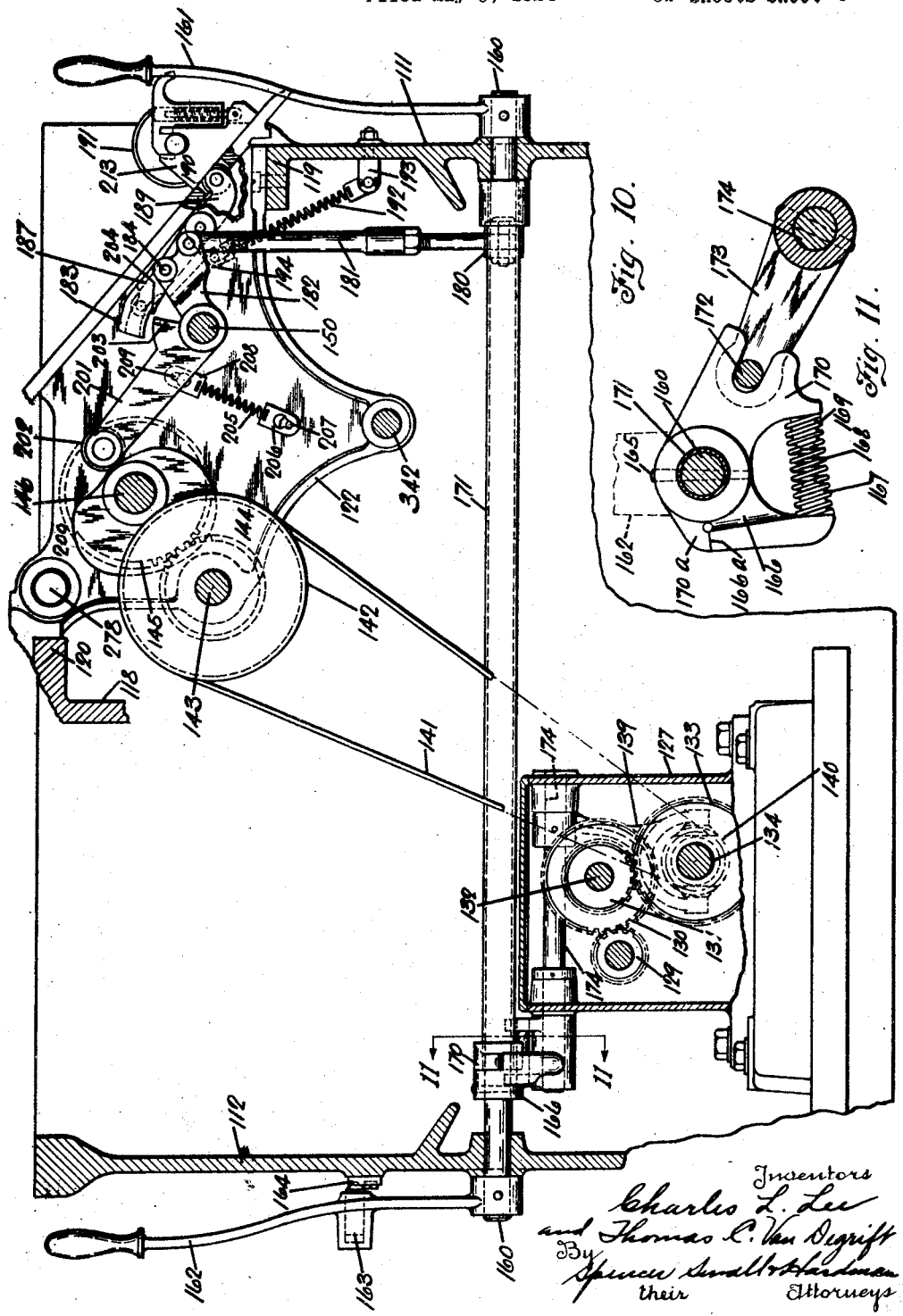

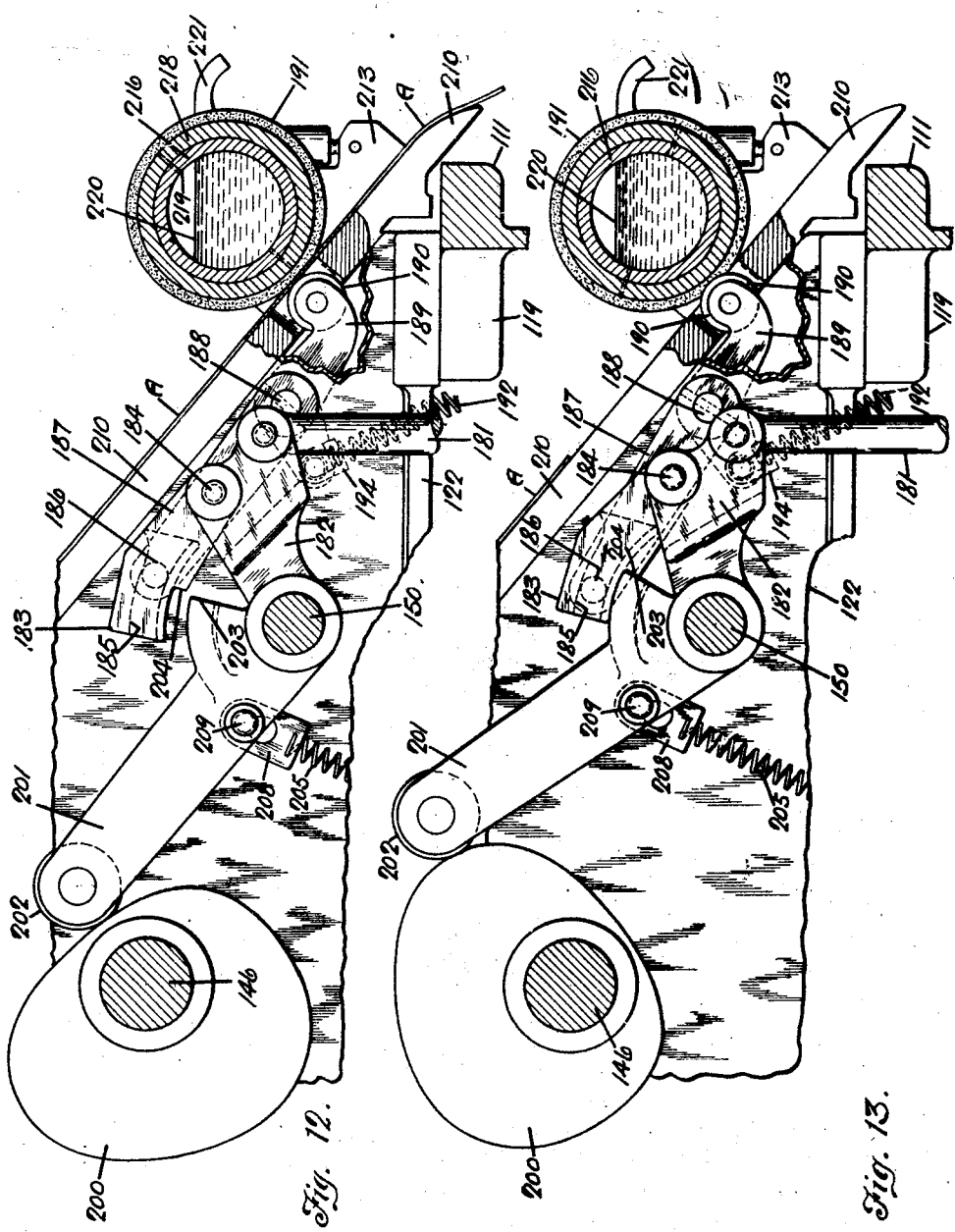

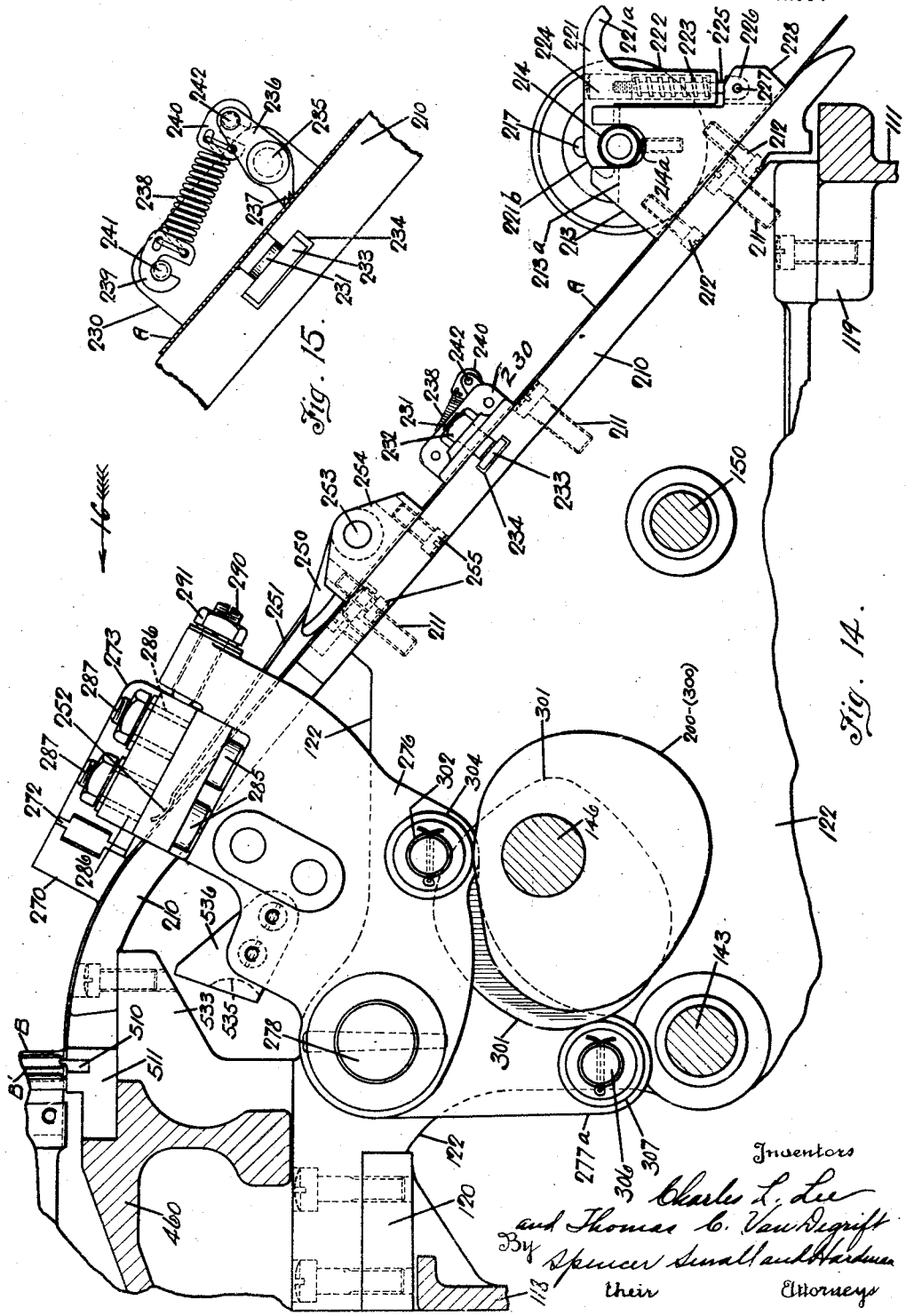

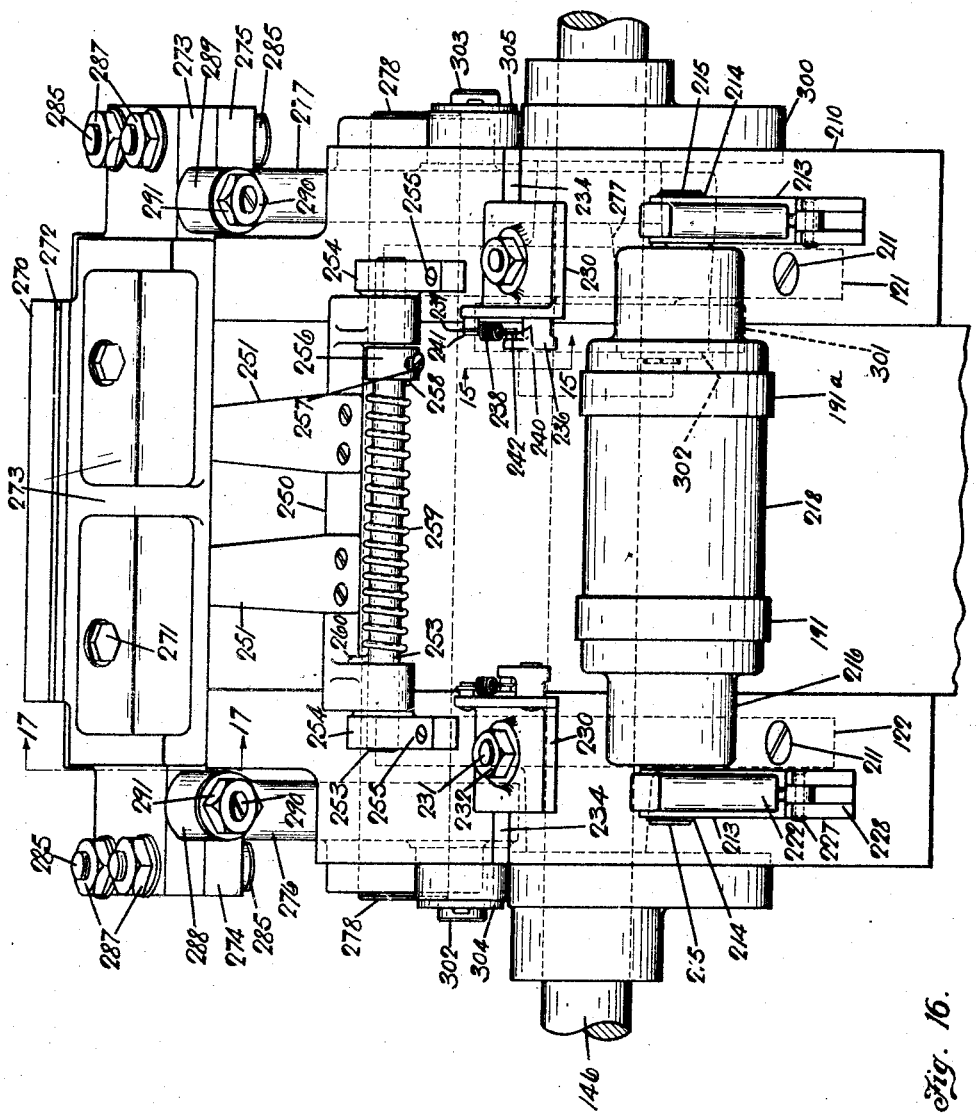

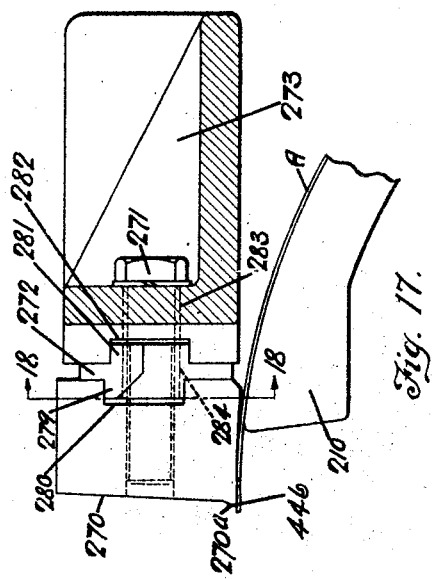
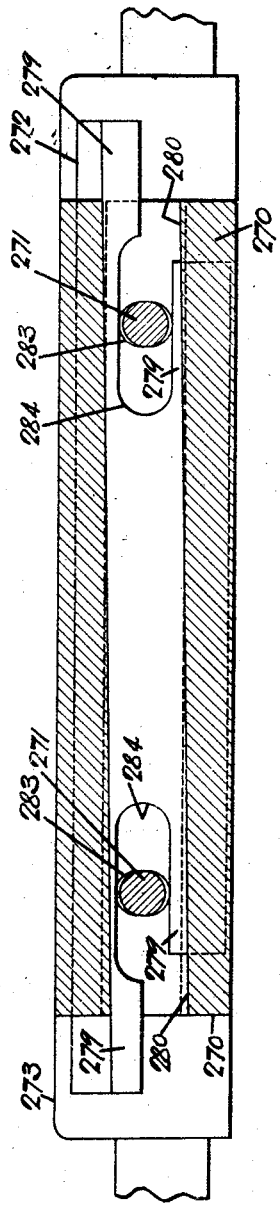

April 13, 1926.
C. L. LEE ET AL
1,580,505
METAL FOLDING MACHINE
Filed May 9, 1924   32 Sheets-Sheet 13
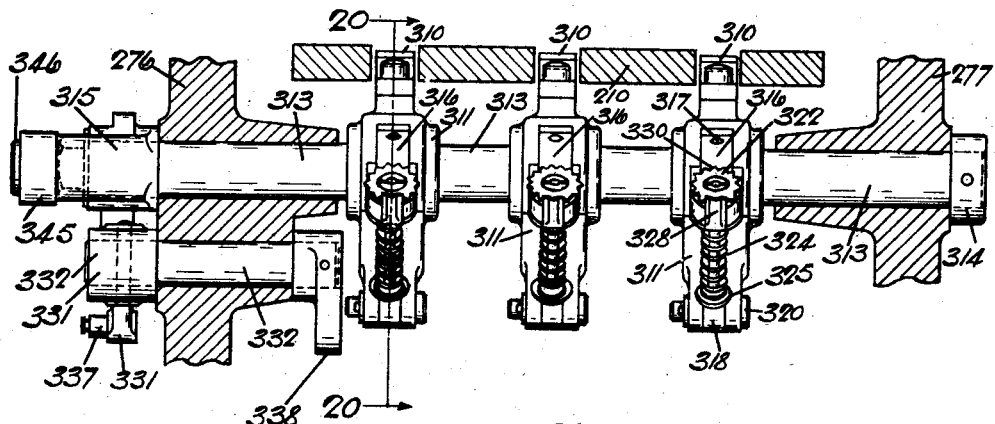
Fig. 19.
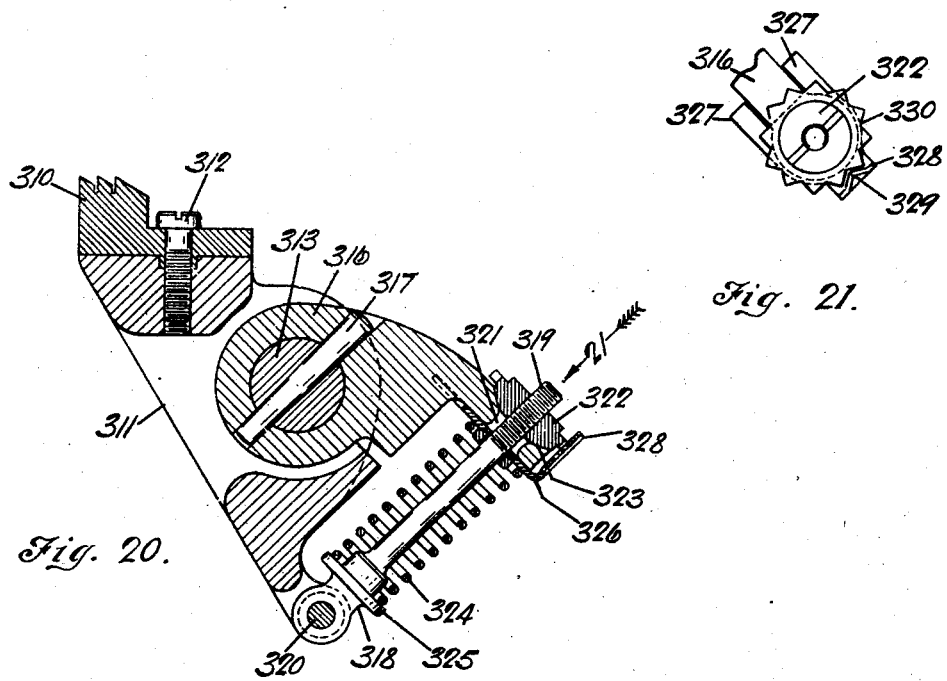
Fig. 21.
Fig. 20.
Inventors
Charles L. Lee and
Thomas C. Van Degrift
By Spencer Small and Hardman
their Attorneys

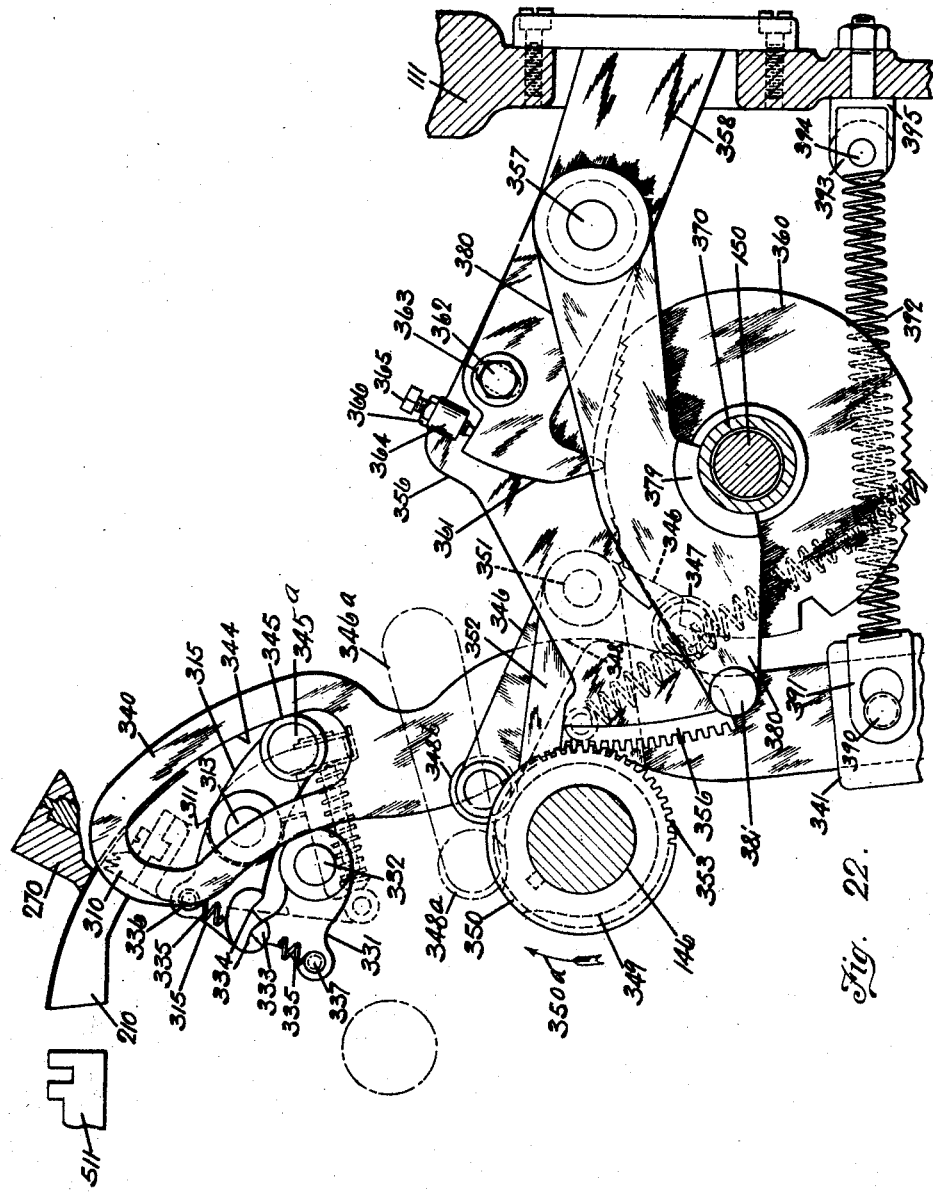

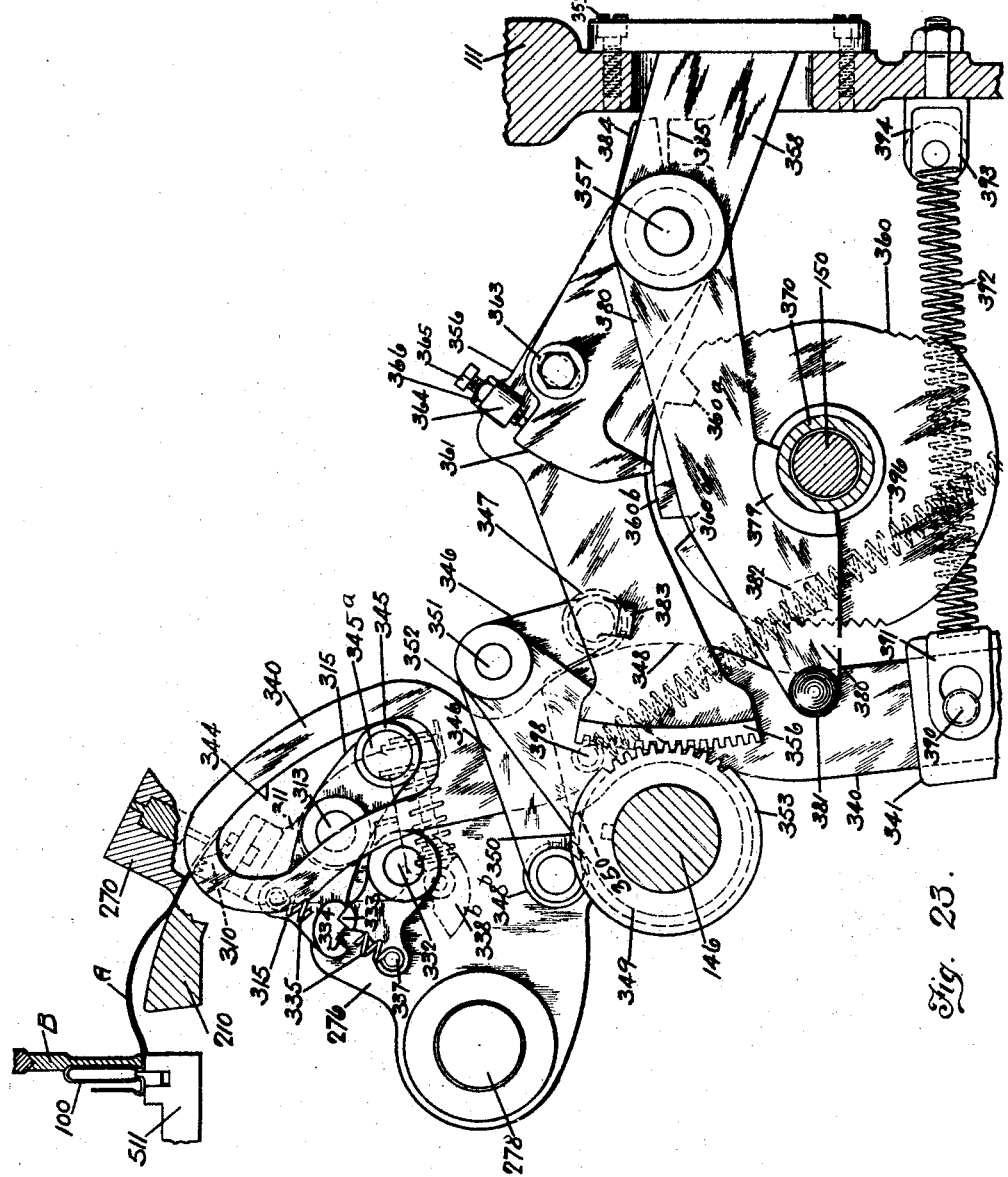

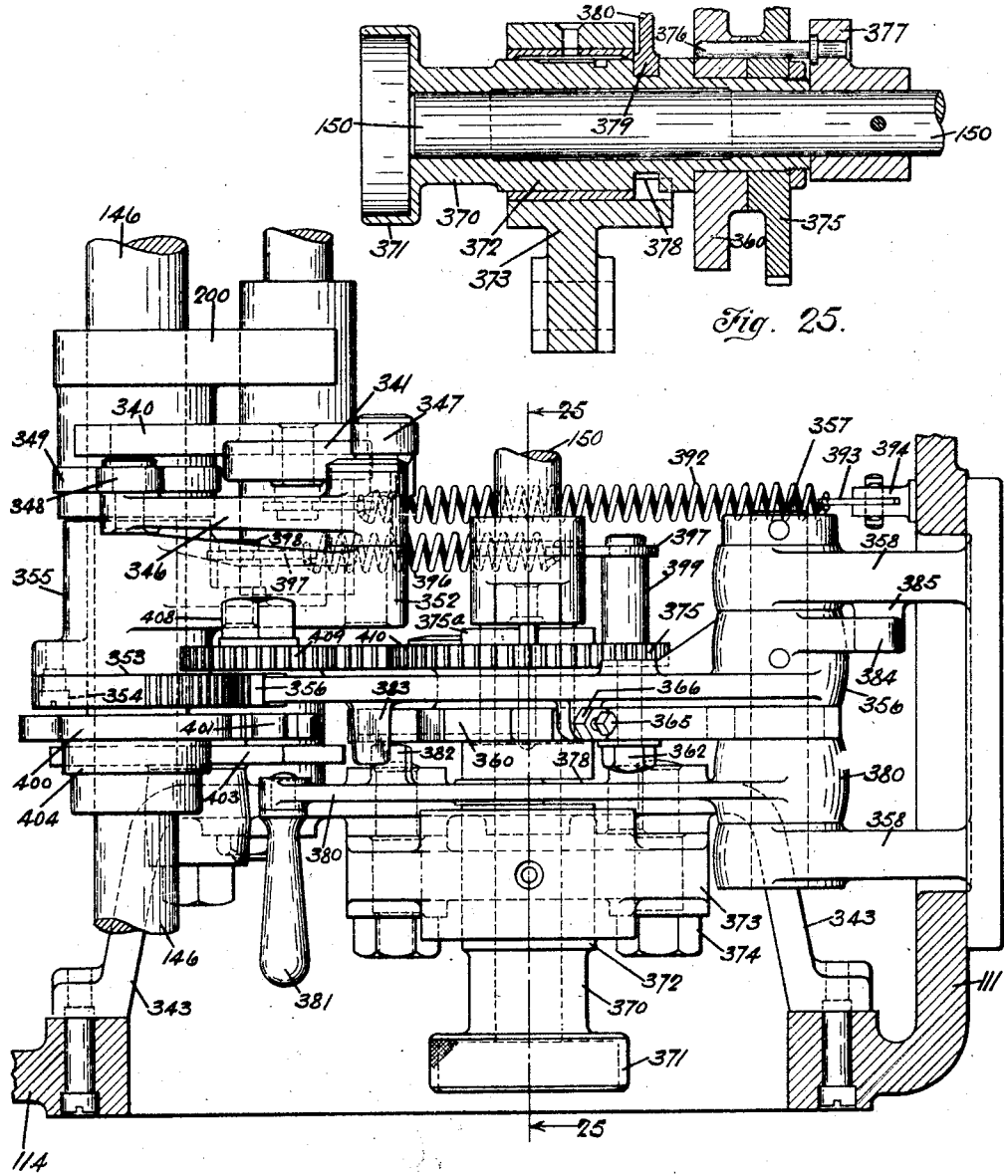

April 13, 1926.

C. L. LEE ET AL 1,580,505

METAL FOLDING MACHINE

Filed May 9, 1924

April 13, 1926. 1,580,505
C. L. LEE ET AL
METAL FOLDING MACHINE
Filed May 9, 1924   32 Sheets-Sheet 18

Inventors
Charles L. Lee and
Thomas C. Van Degrift
By Spencer, Sewall and Hardman
their Attorneys

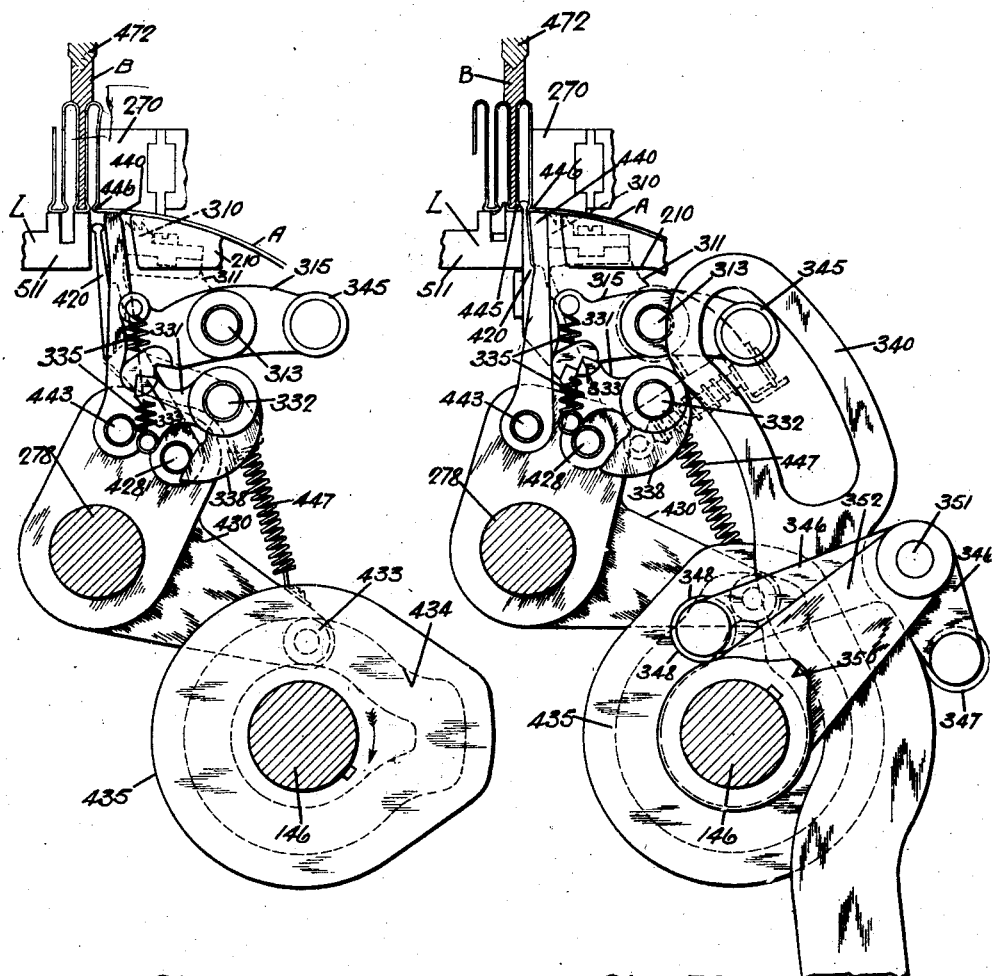

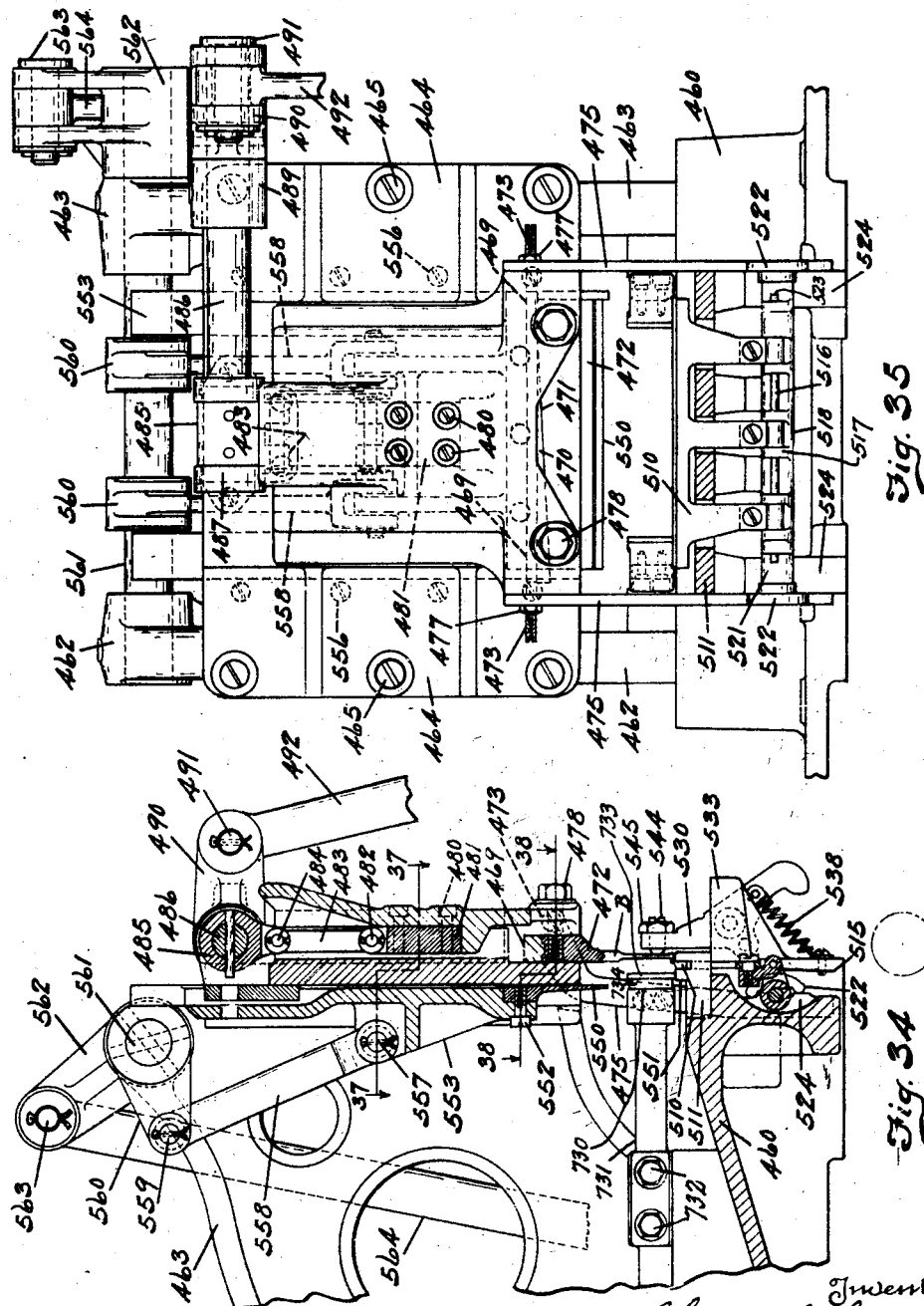

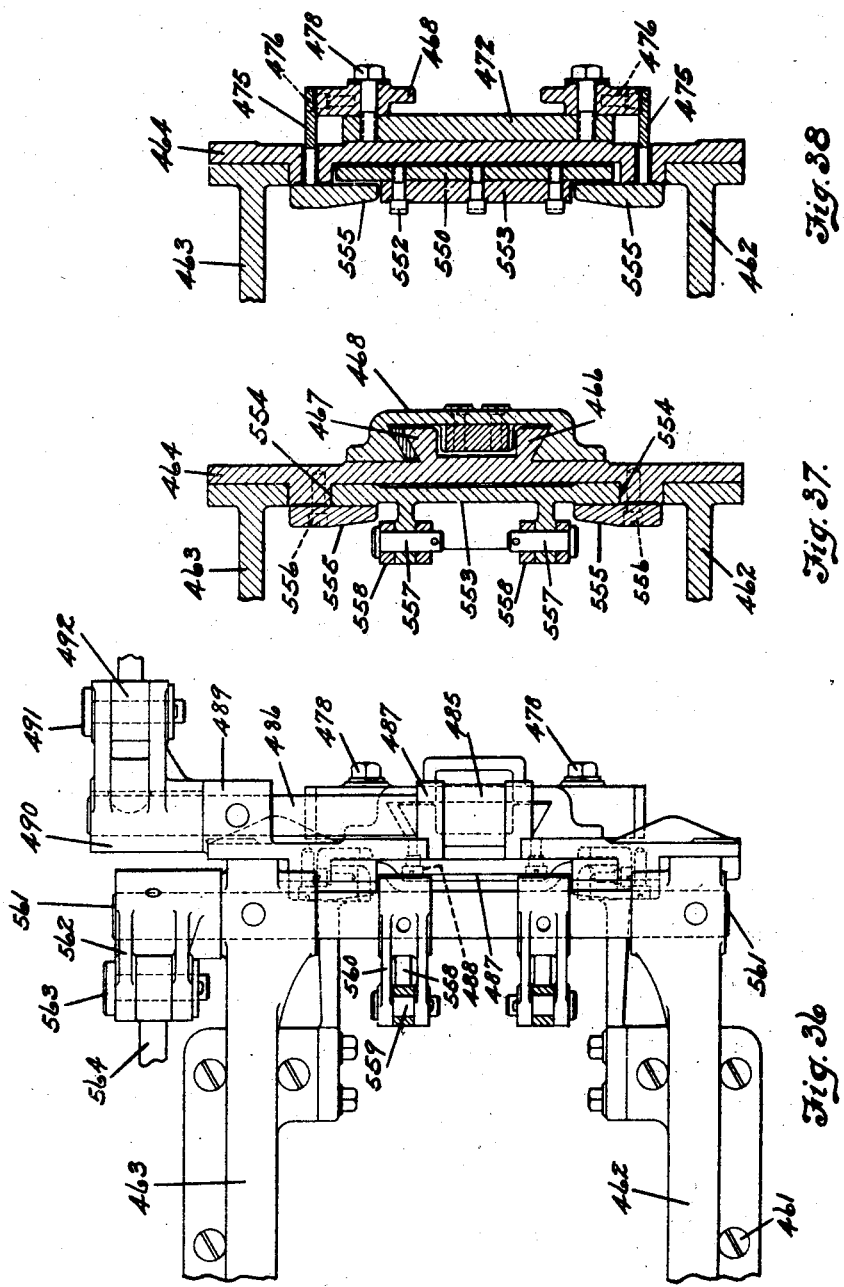

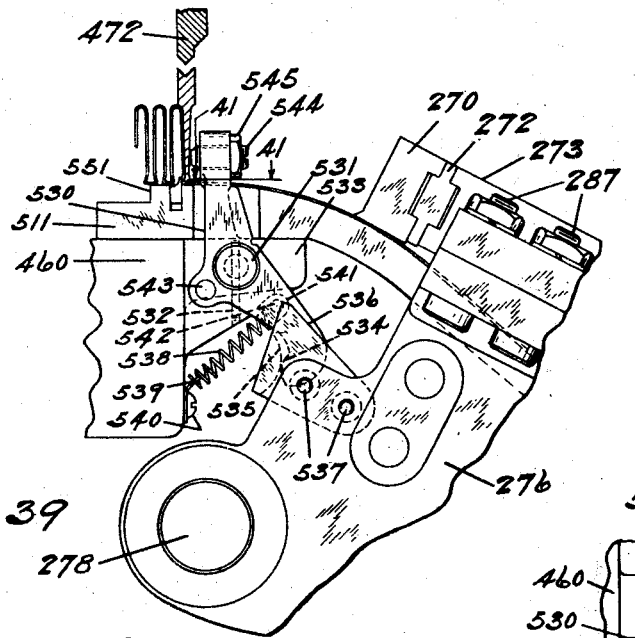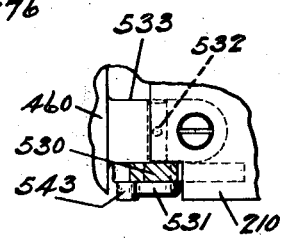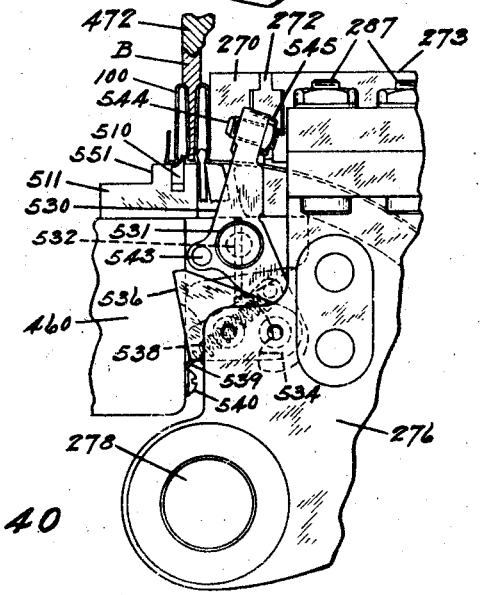

April 13, 1926.

C. L. LEE ET AL 1,580,505

METAL FOLDING MACHINE

Filed May 9, 1924

Inventors
Charles L. Lee and
Thomas C. Van Degrift
By their Attorneys

April 13, 1926.  
C. L. LEE ET AL  
1,580,505

METAL FOLDING MACHINE

Filed May 9, 1924  32 Sheets-Sheet 24

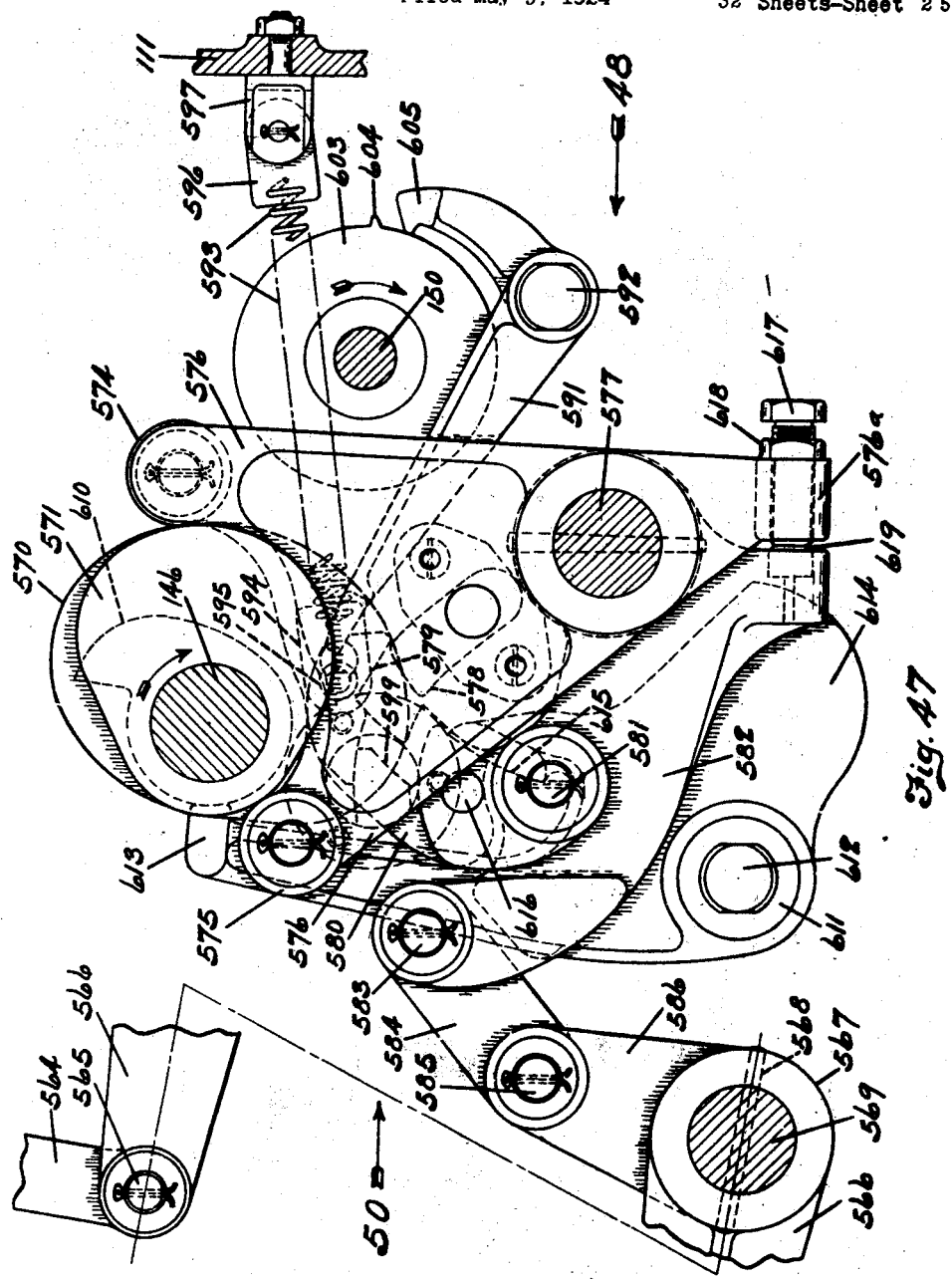

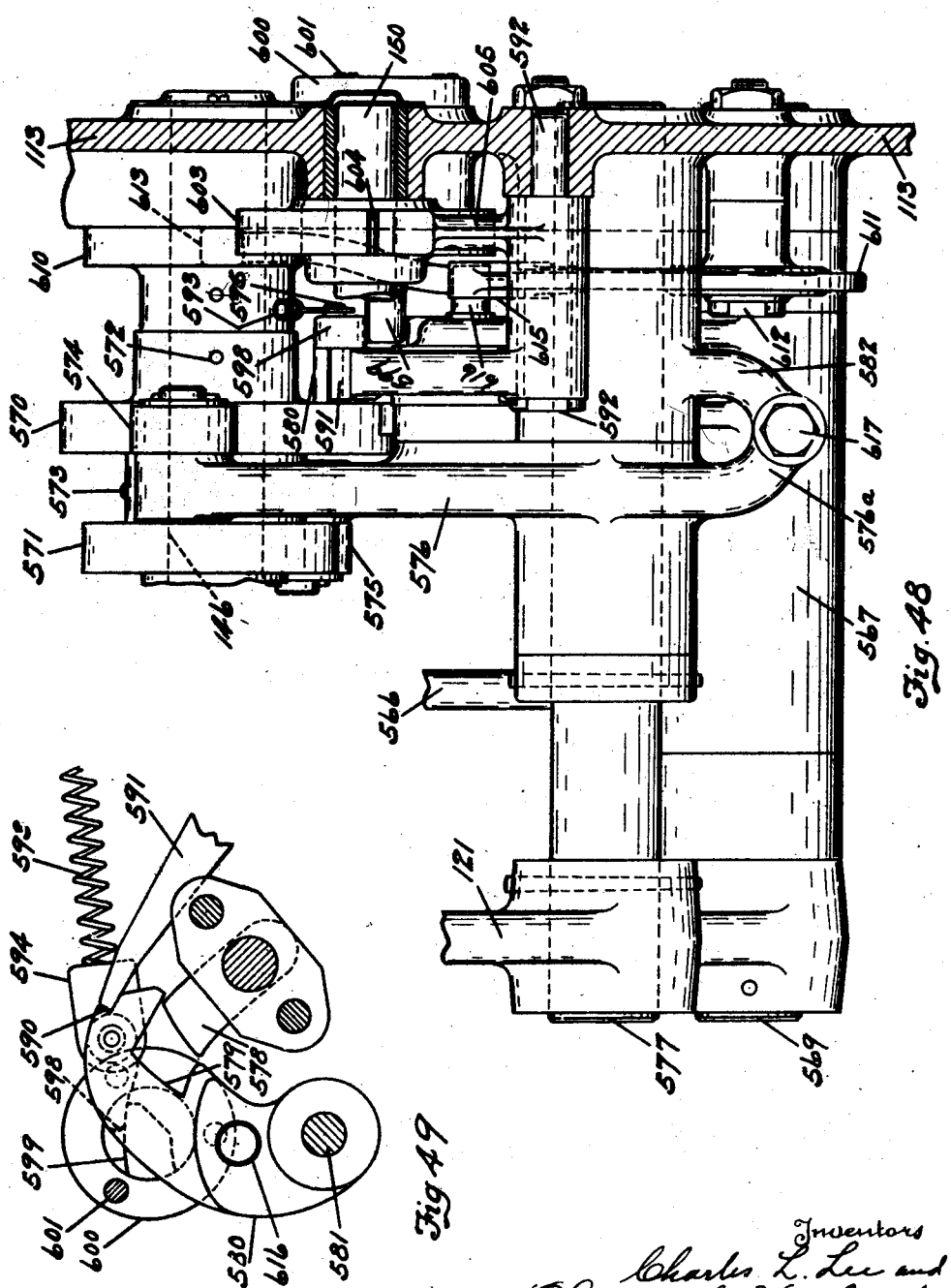

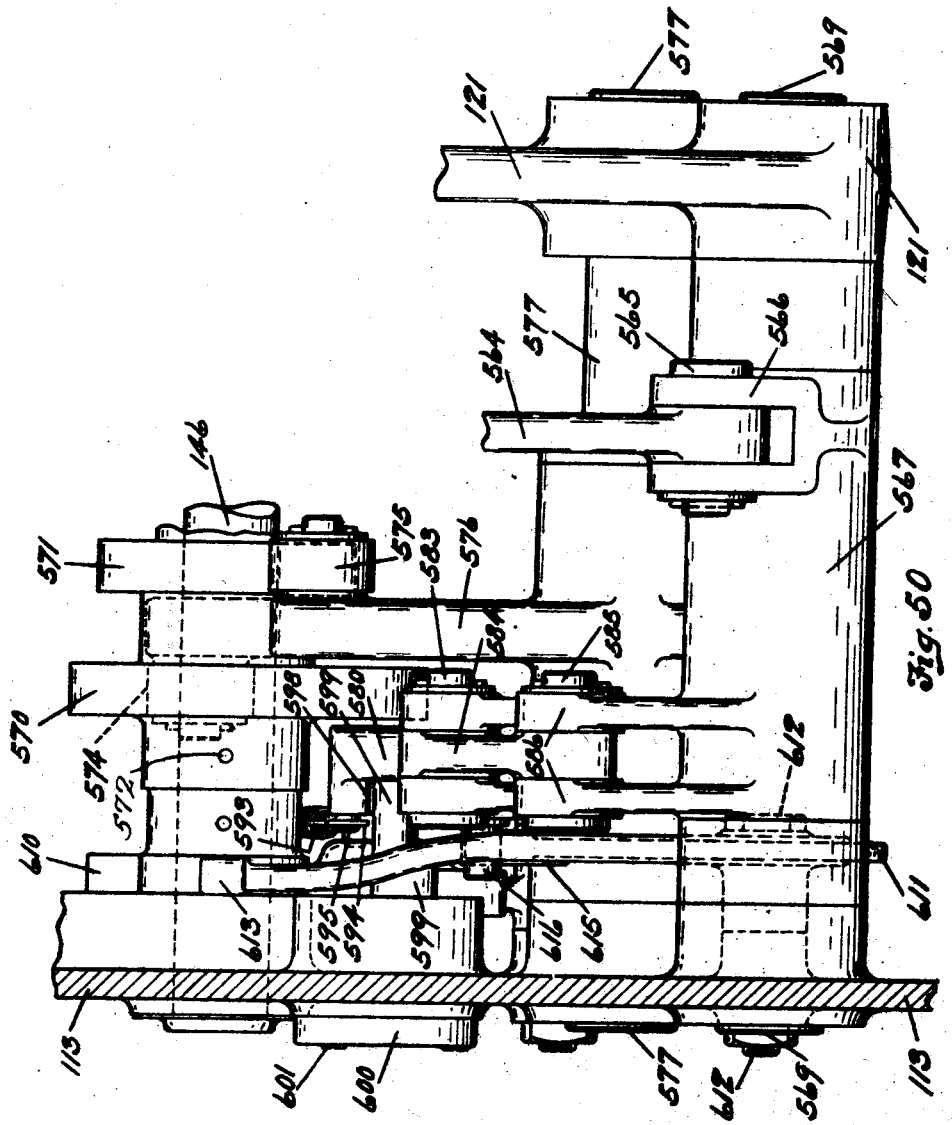

April 13, 1926.

C. L. LEE ET AL 1,580,505

METAL FOLDING MACHINE

Filed May 9, 1924     32 Sheets-Sheet 28

Inventors
Charles L. Lee
and Thomas C. VanDegrift
By Spencer Small and Hardman
their Attorneys

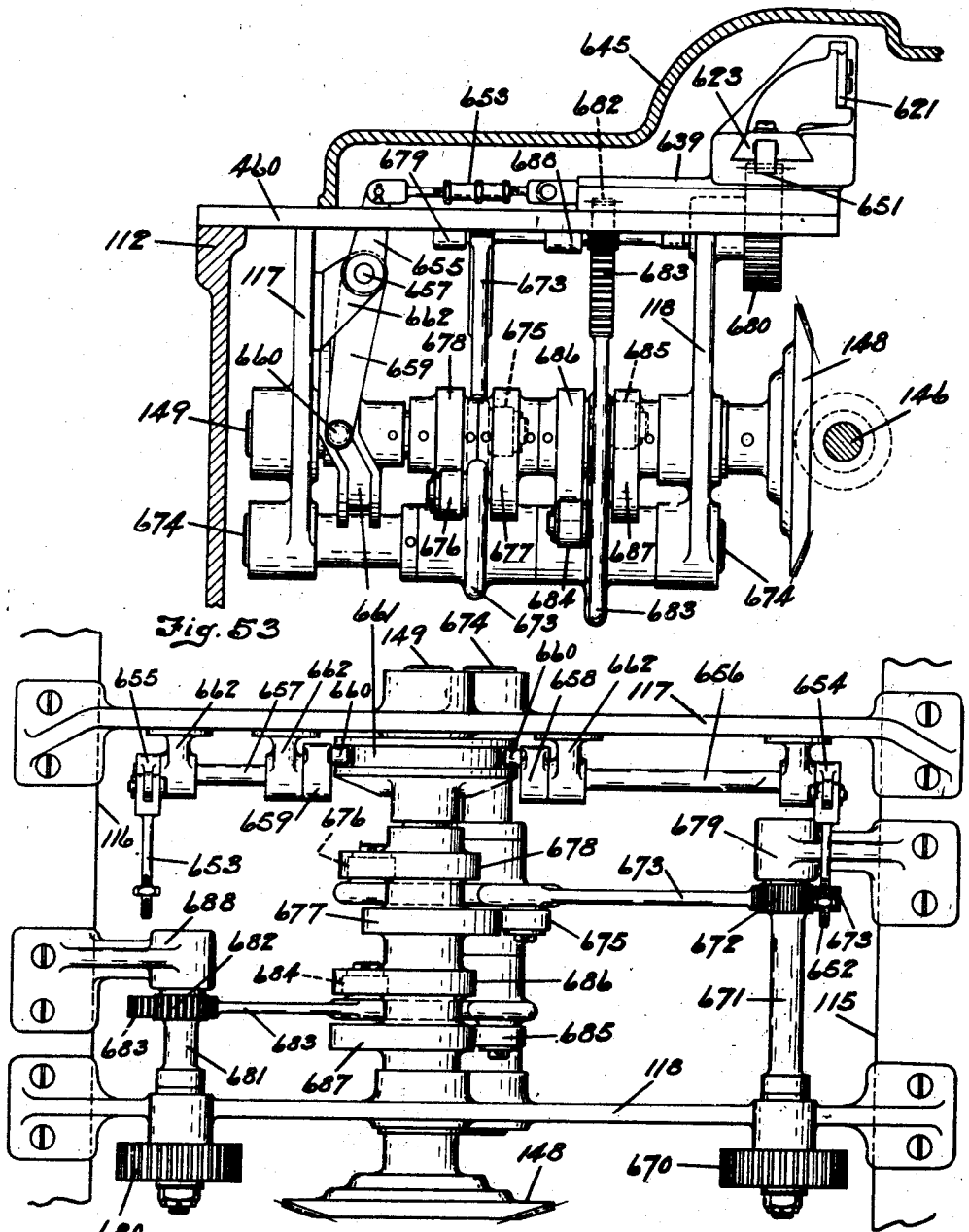

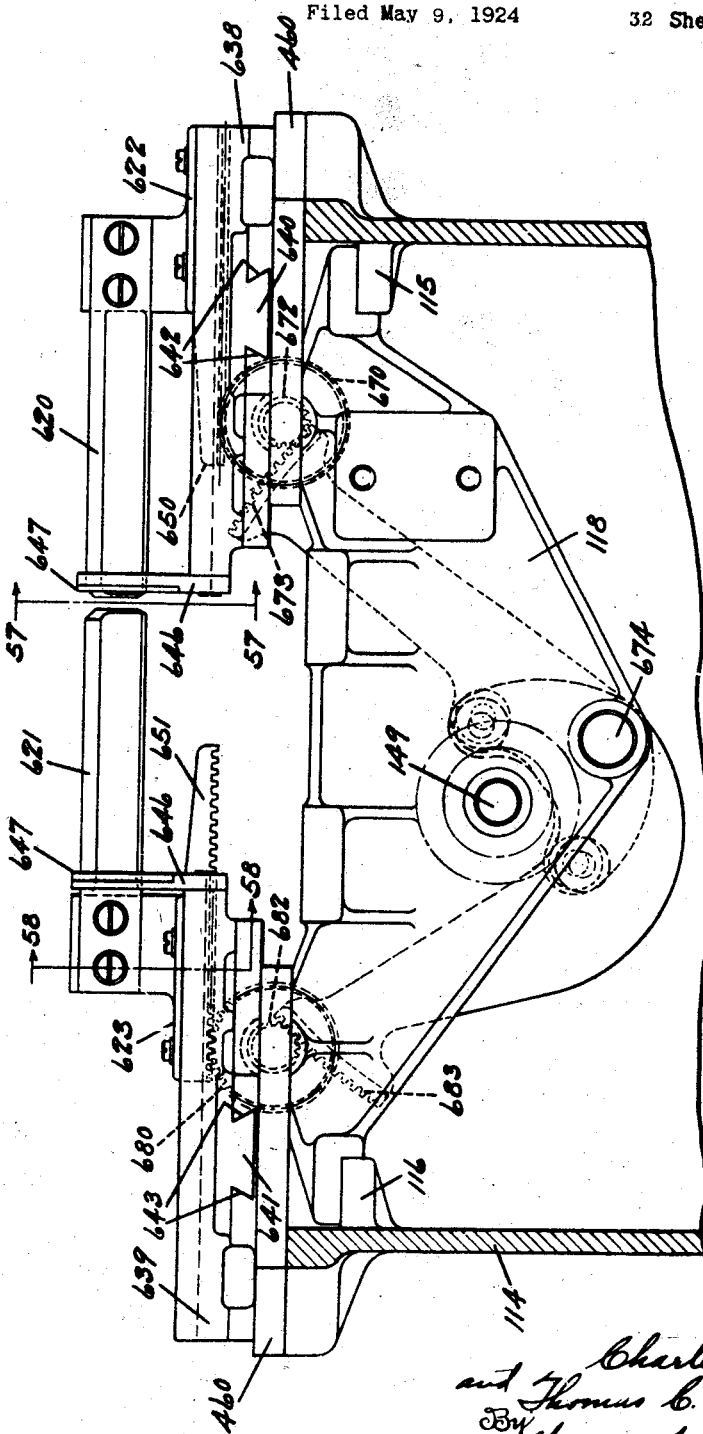

April 13, 1926.
C. L. LEE ET AL
1,580,505
METAL FOLDING MACHINE
Filed May 9, 1924
32 Sheets-Sheet 31
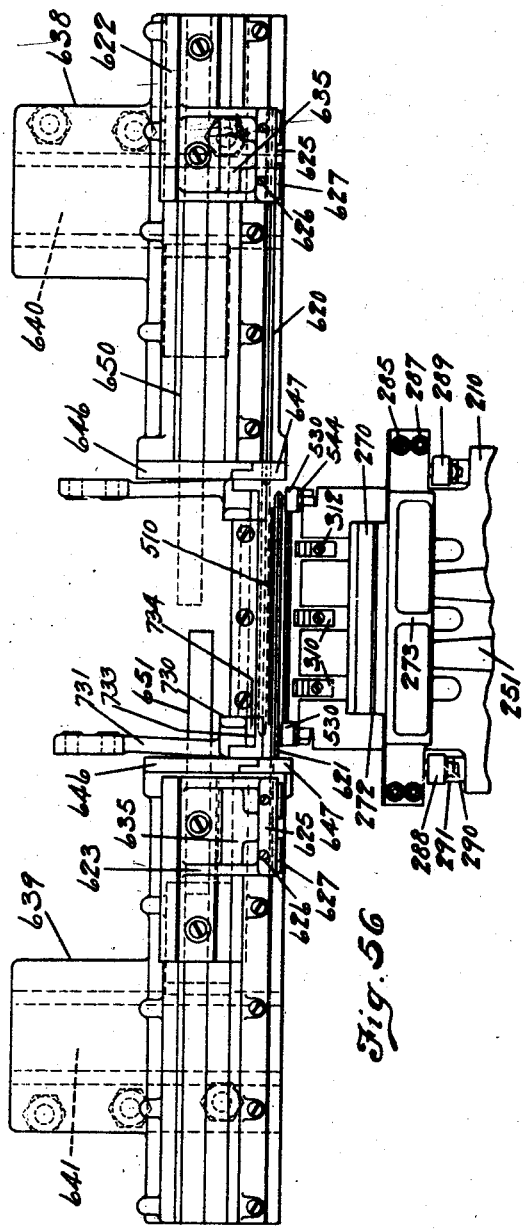
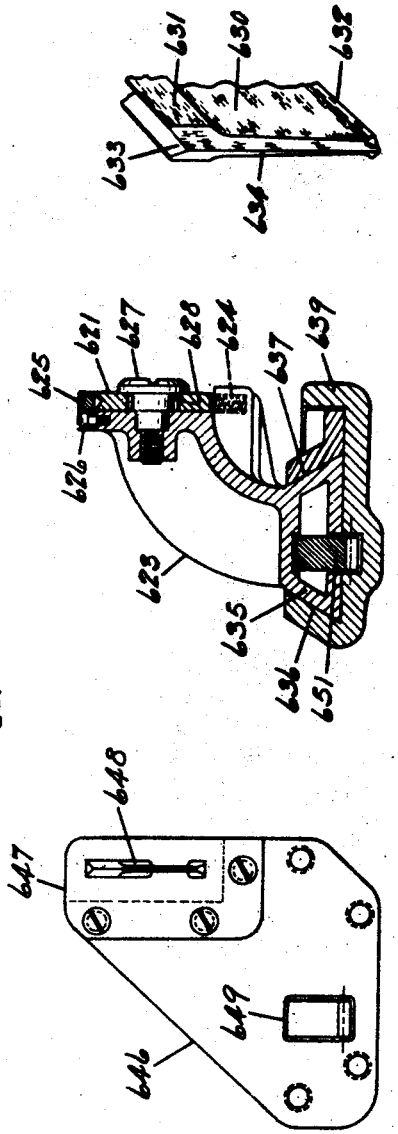
Inventors
Charles L. Lee
and Thomas C. Van Dygrift
By Spencer Small & Hardman
their Attorneys Patented Apr. 13, 1926.

1,580,505

UNITED STATES PATENT OFFICE.

CHARLES L. LEE AND THOMAS C. VAN DEGRIFT, OF DAYTON, OHIO, ASSIGNORS TO GENERAL MOTORS RESEARCH CORPORATION, OF DAYTON, OHIO, A CORPORATION OF DELAWARE.

METAL-FOLDING MACHINE.

Application filed May 9, 1924. Serial No. 712,126.

*To all whom it may concern:*

Be it known that we, CHARLES L. LEE and THOMAS C. VAN DEGRIFT, citizens of the United States of America, residing at Dayton, county of Montgomery, and State of Ohio, have invented certain new and useful Improvements in Metal-Folding Machines, of which the following is a full, clear, and exact description.

The present invention relates to machines for folding sheet material and in its preferred form of embodiment, which has been chosen for the purpose of description and illustration, relates more particularly to a machine for holding sheet metal in a form suitable for cooling fins to be applied to the cylinders of internal-combustion engines and also suitable for various other purposes.

Among the objects of the invention are to fold such metal from a continuous strip so that the folds or convolutions are of predetermined size and uniformly spaced, and, if desired, to cut the material in lengths suitable for the purpose for which it is folded.

More specifically, the present invention relates to improvements in a machine for folding sheet material disclosed in the patent to Charles L. Lee, Number 1,507,318, issued Sept. 2, 1924. These improvements are such as enable the folding of convolutions from relatively thick sheet material varying in width over a relatively wide range.

A further object of the invention is to stop the machine automatically when the supply of sheet material through the machine is exhausted.

Further objects and advantages of the present invention will be apparent from the following description, reference being had to the accompanying drawings, wherein a preferred form of embodiment of the present invention is clearly shown.

In the drawings:

Figure 1 is a fragmentary perspective view from the front and the right side of a machine embodying the present invention;

Fig. 2 is a perspective view of a plurality of metal folds or loops formed by the machine shown in Fig. 1;

Fig. 5 is a diagrammatic view showing some of the principal operating elements of the machine;

Figure 9:
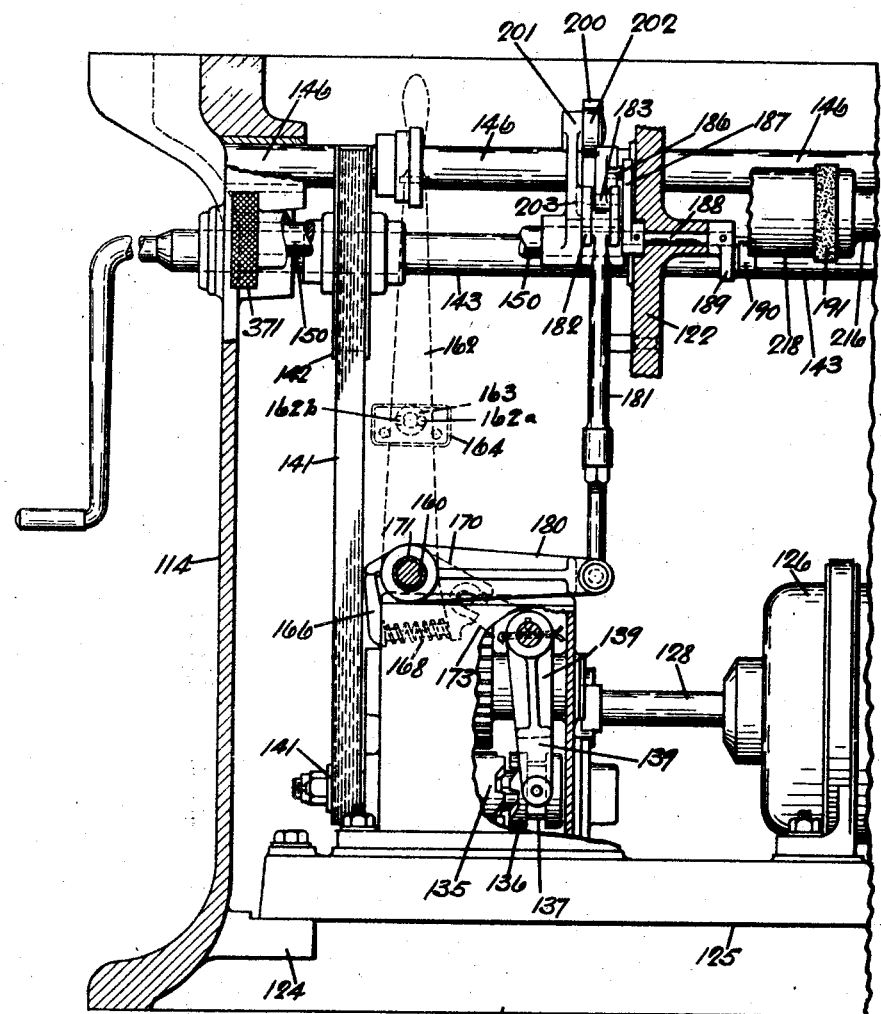

Figs. 6 and 7 taken together constitute a plan view of the machine-driving mechanism and cam shafts;

Fig. 8 is a sectional view of a portion of the mechanism shown in Figs. 6 and 7, the section being taken on the line 8—8 of these figures;

Fig. 9 is a fragmentary view similar to Fig. 8 taken on the line 9—9 of Fig. 7;

Fig. 10 is a sectional view of the driving mechanism taken partly on the line 10—10 of Fig. 7 and partly on the line 10ª—10ª of Fig. 7;

Fig. 11 is a fragmentary view on an enlarged scale of a portion of the automatic stop mechanism, the sectional view being taken on the line 11—11 of Fig. 10;

Figs. 12 and 13 are two fragmentary side-views of a portion of the automatic stop control mechanism in two conditions of operation;

Fig. 14 is a fragmentary sectional view taken on the line 14—14 of Fig. 1, showing the sheet metal platen and the ram which constitutes a part of the folding mechanism;

Fig. 15 is a sectional view on an enlarged scale of a metal guide grip, the section being taken on the line 15—15 of Fig. 16;

Fig. 16 is a front elevation of the mechanism shown in Fig. 14, viewed in the direction of the arrow 16;

Fig. 17 is a fragmentary sectional view on an enlarged scale taken on the line 17—17 of Fig. 16;

Fig. 18 is a sectional view on the line 18—18 of Fig. 17;

Fig. 19 is a front view partly in section of the metal grips and operating mechanism shown in Figs. 22 and 23.

Figure 3:
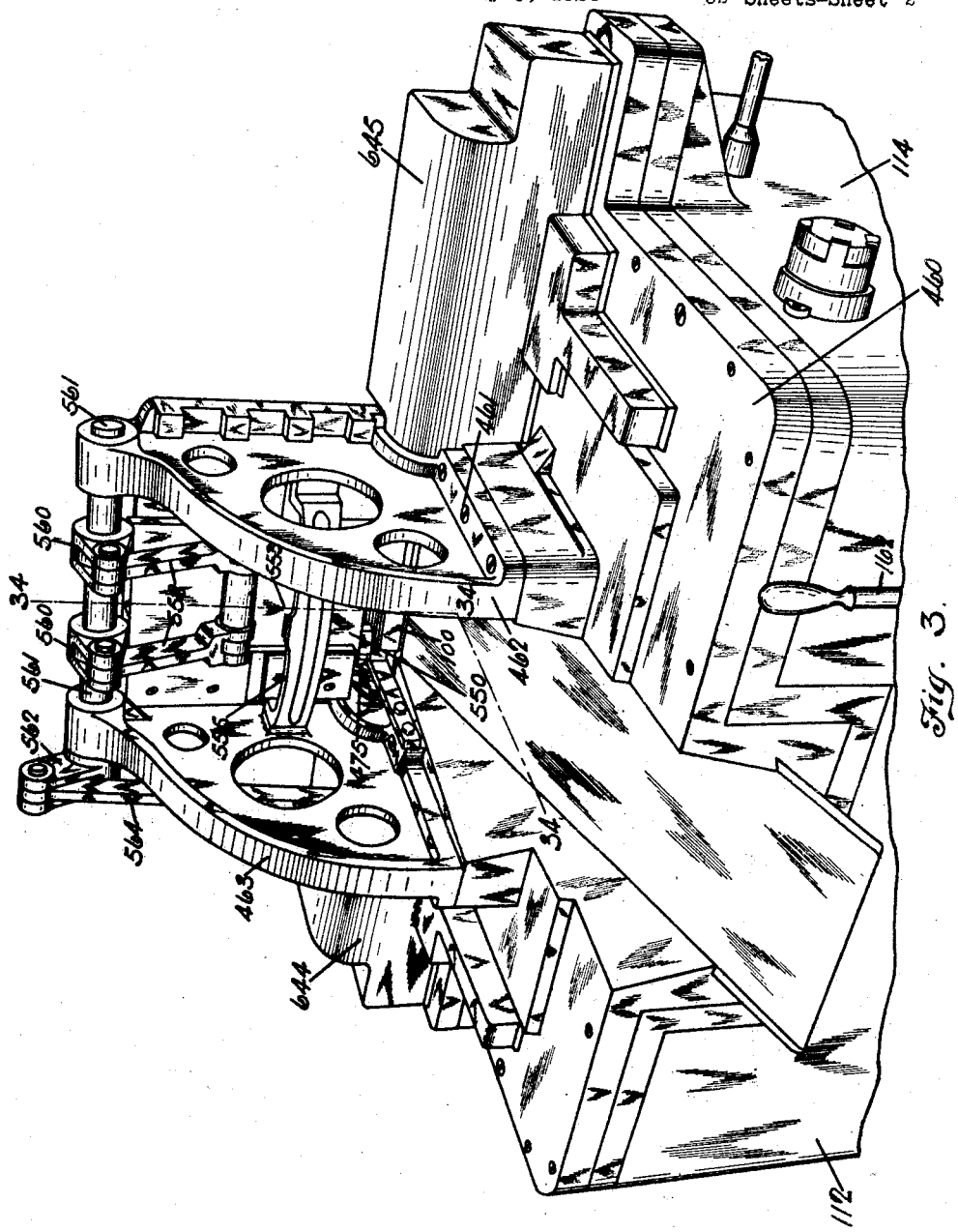
Fig. 3 is a fragmentary perspective view of the metal folding machine taken from the rear and left side.
Figure 4:
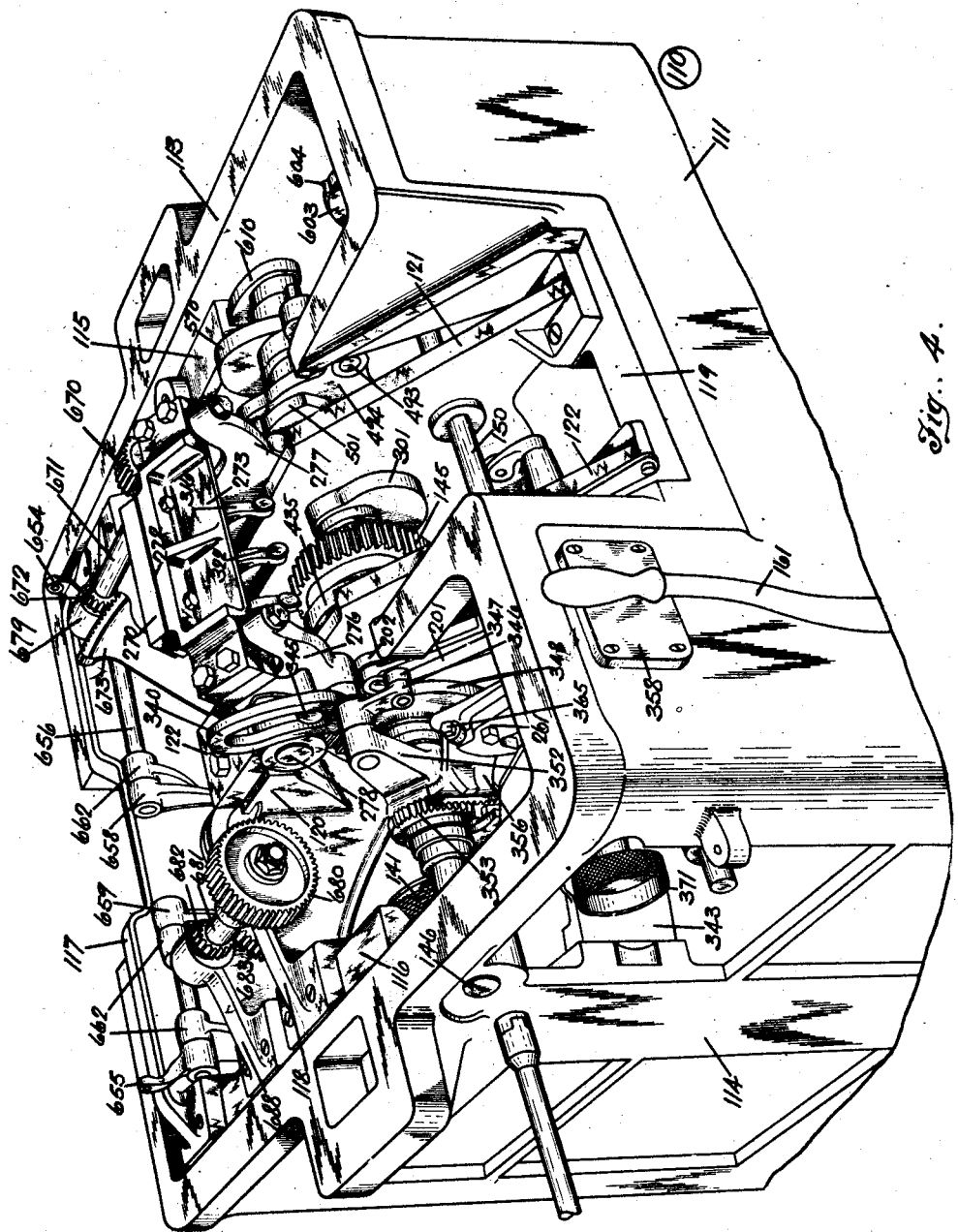
Fig. 4 is a fragmentary perspective view with a portion of the machine removed to show part of the interior mechanism.
Figure 26:
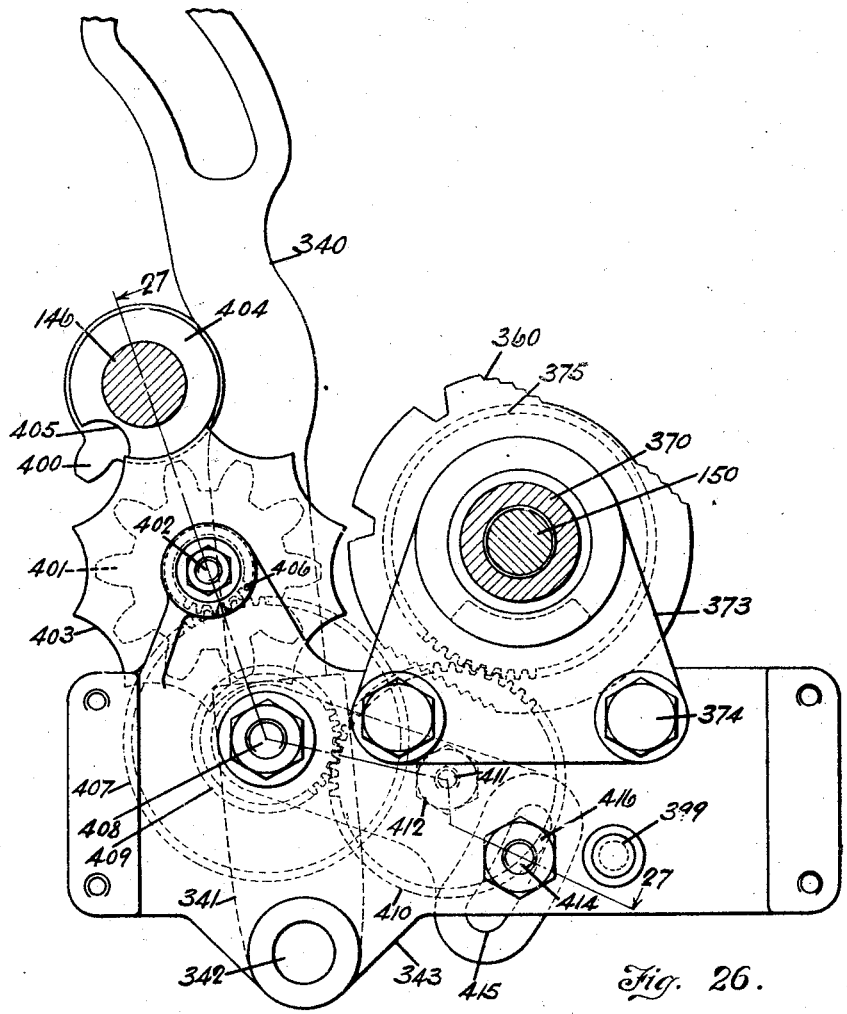
Figure 27:
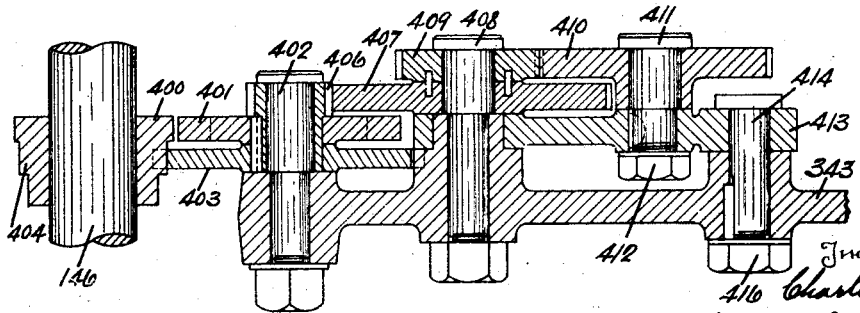
Figure 28:
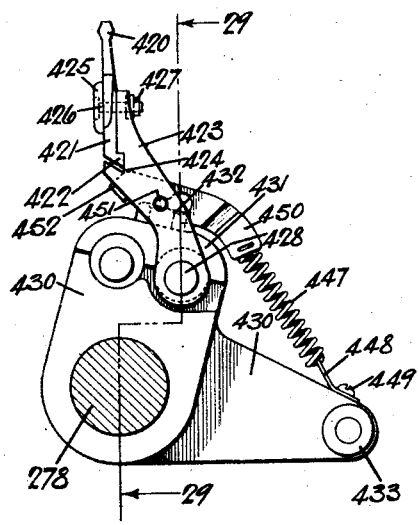
Figure 29:
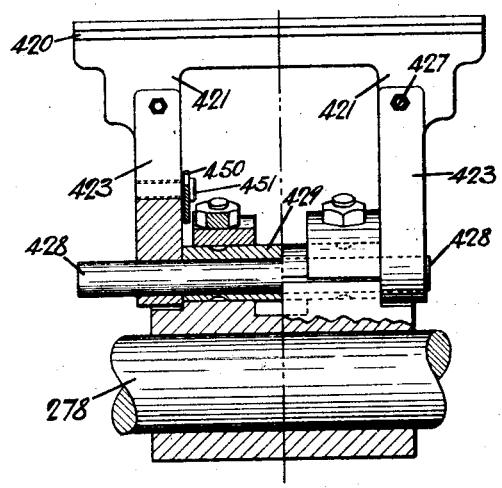
Figure 30:
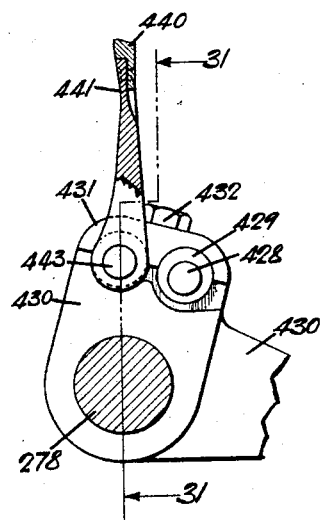
Figure 31:
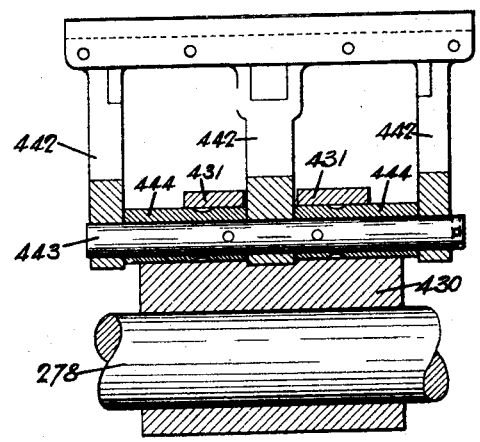
Figures 43, 44:
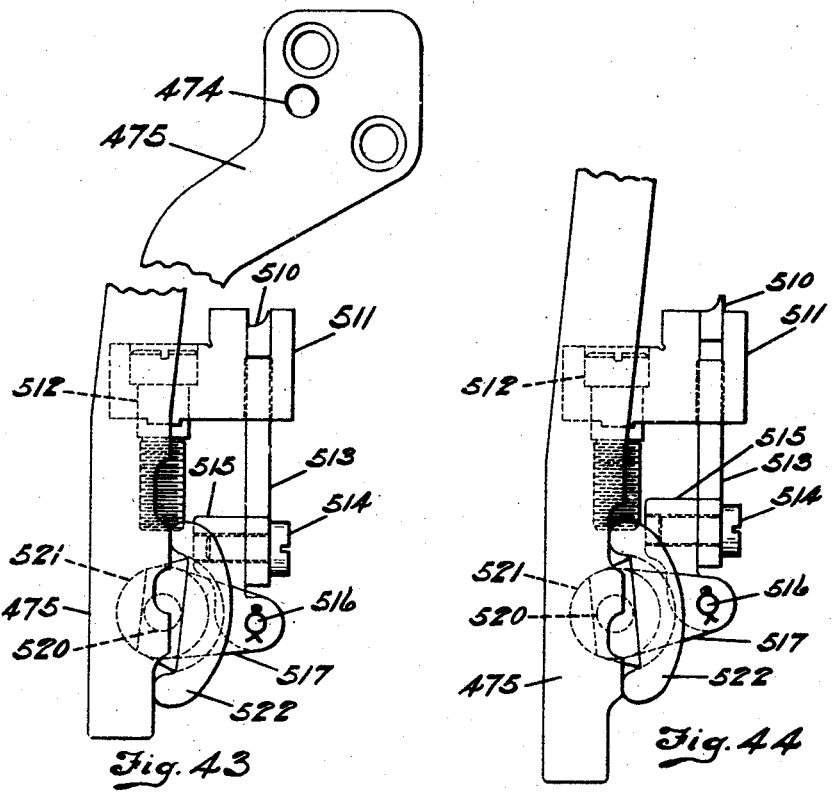
Figure 42:
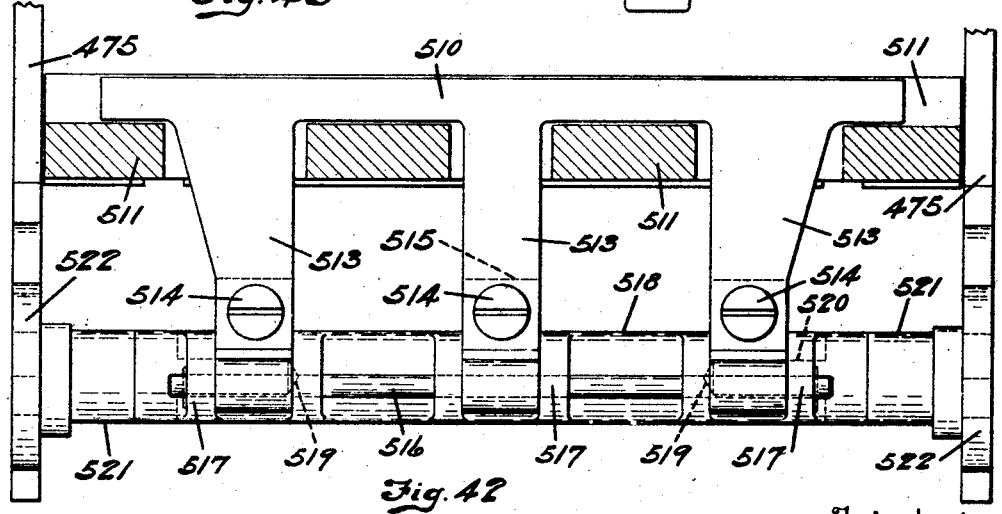
Figure 46:
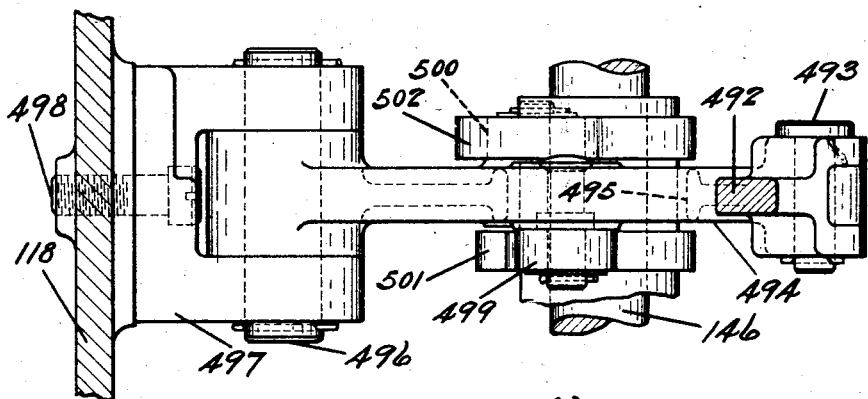
Figure 45:
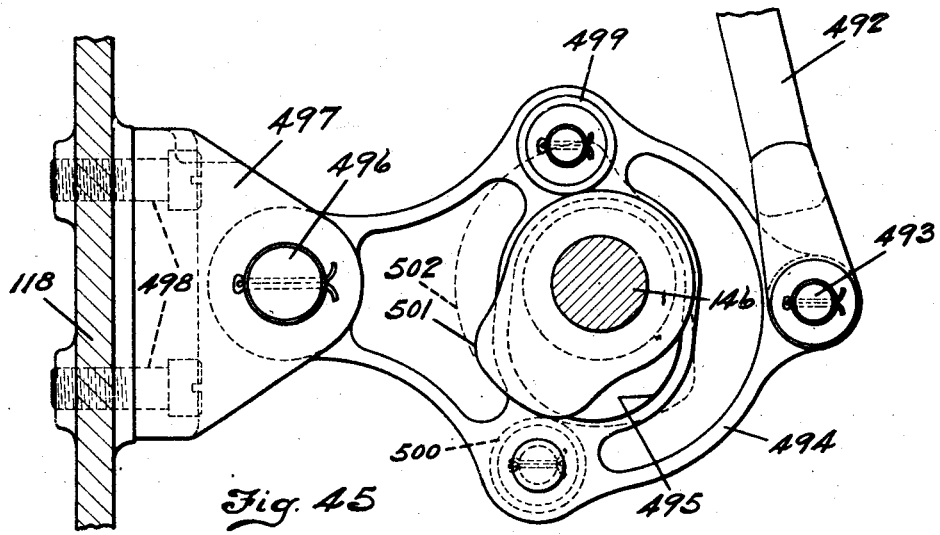
Figure 51:
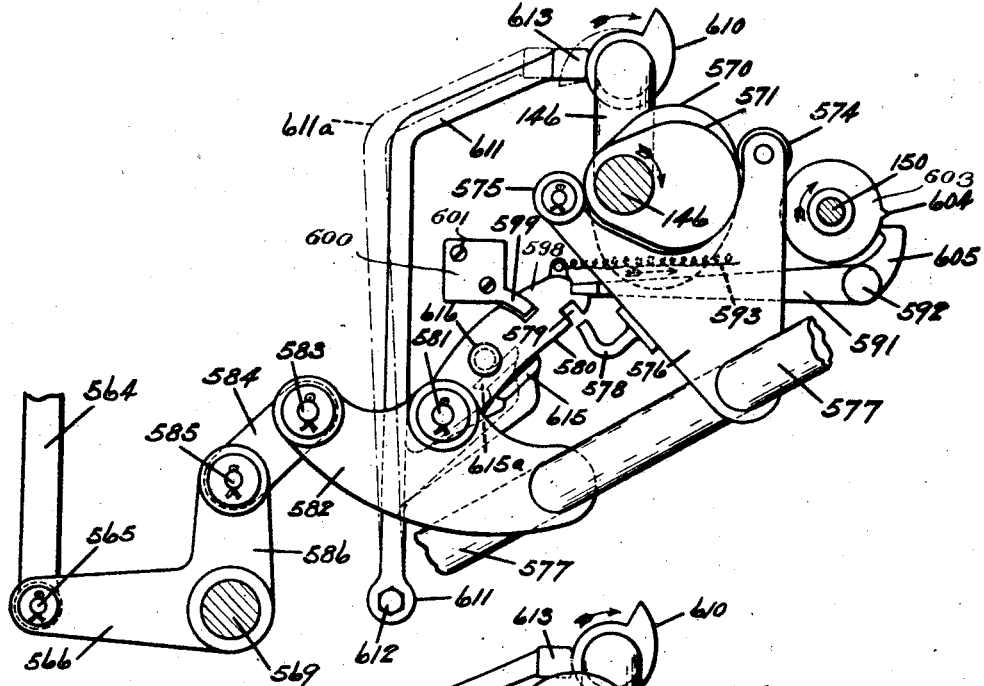
Figure 52:
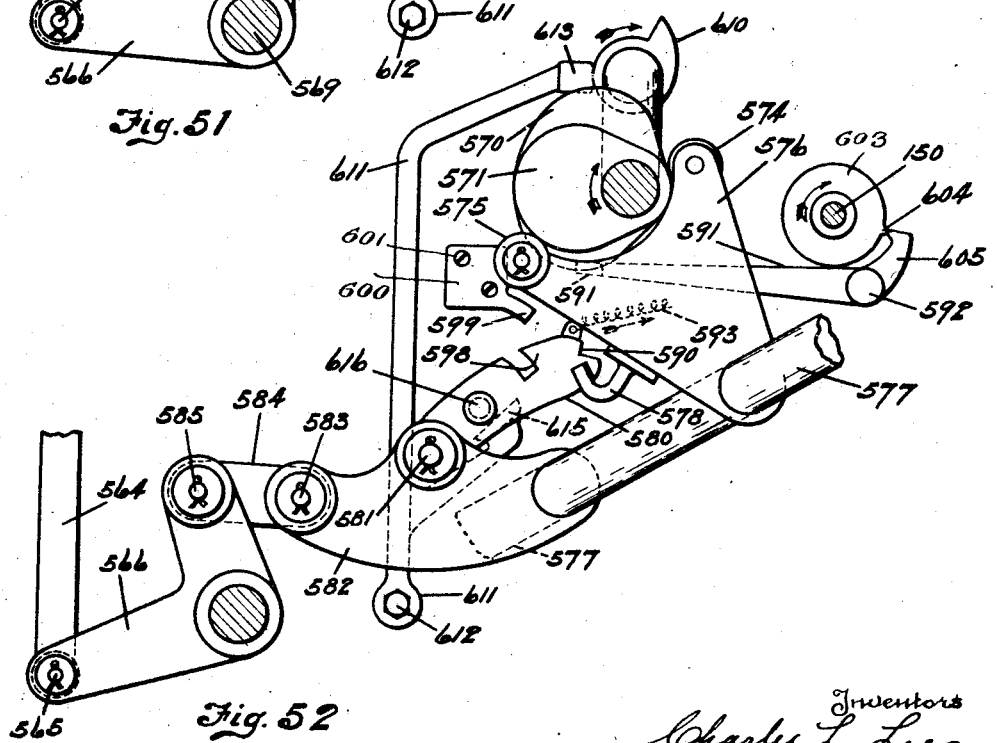

Fig. 20 is a sectional view on an enlarged scale, the section being taken on the line 20—20 of Fig. 19;

Fig. 21 is a fragmentary view in the direction of the arrow 21 in Fig. 20;

Figs. 22 and 23 are fragmentary side views of the mechanism for controlling the clamping of the metal to the metal folding ram, these views showing the mechanism in two conditions of operation;

Fig. 24 is a plan view of the timing mechanism for controlling the amount of material folded into a convolution;

Fig. 25 is a sectional view on line 25—25 of Fig. 24;

Fig. 26 is an elevation of the mechanism for driving the master or formed cam;

Fig. 27 is a sectional view on the line 27—27 of Fig. 26;

Fig. 28 is a front elevation of the base form and operating mechanism;

Fig. 29 is an end view thereof partly in section, the section being taken on line 29—29 of Fig. 28;

Fig. 30 is a front elevation of the base form stripper and operating mechanism therefor;

Fig. 31 is an end view thereof partly in section, the section being taken on line 31—31 of Fig. 30;

Figs. 32 and 33 are end views of the base form and base form stripper operating mechanism, these views showing the mechanism in two conditions of operation;

Fig. 34 is a fragmentary sectional view showing a matrix clamp and the knife and operating mechanisms therefor, this section being taken on the plane 34—34—34 of Fig. 3;

Fig. 35 is a fragmentary elevation partly in section showing the matrix clamp and operating mechanism, this view being taken in the direction of the arrow 35 in Fig. 1;

Fig. 36 is a plan view of the part of the mechanism shown in Figs. 34 and 35;

Fig. 37 is a sectional view on the line 37—37 of Fig. 34;

Fig. 38 is a sectional view on the line 38—38 of Fig. 34;

Figs. 39 and 40 are fragmentary side views of the matrix positioning pawls and operating mechanism, these views showing the mechanisms in two conditions of operation;

Fig. 41 is a sectional view on the line 41—41 of Fig. 39;

Fig. 42 is a fragmentary front view of the matrix back stop and operating mechanism therefor;

Figs. 43 and 44 are fragmentary side views showing the matrix back stop and operating mechanism in two conditions of operation;

Figs. 45 and 46 are side and plan views partly in section, respectively, of the matrix clamp cam and cam lever;

Fig. 47 is a side view partly in section of the knife operating mechanism and automatic control therefor;

Fig. 48 is a view of said mechanism taken in the direction of the arrow 48 in Fig. 47;

Fig. 49 is a view of the portion of the mechanism shown in Fig. 47, this mechanism being detached from its supporting elements for sake of clearness;

Fig. 50 is a view looking in the direction of the arrow 50 in Fig. 47;

Figs. 51 and 52 are mechanical diagrams illustrating the operation of the knife-operating mechanism and control therefor shown in Figs. 47 to 50 inclusive;

Fig. 53 is a side elevation partly in section of the matrix operating mechanism, the section being taken on the line 53—53 of Fig. 7;

Fig. 54 is a plan view of the matrix operating mechanism.

Figure 60:
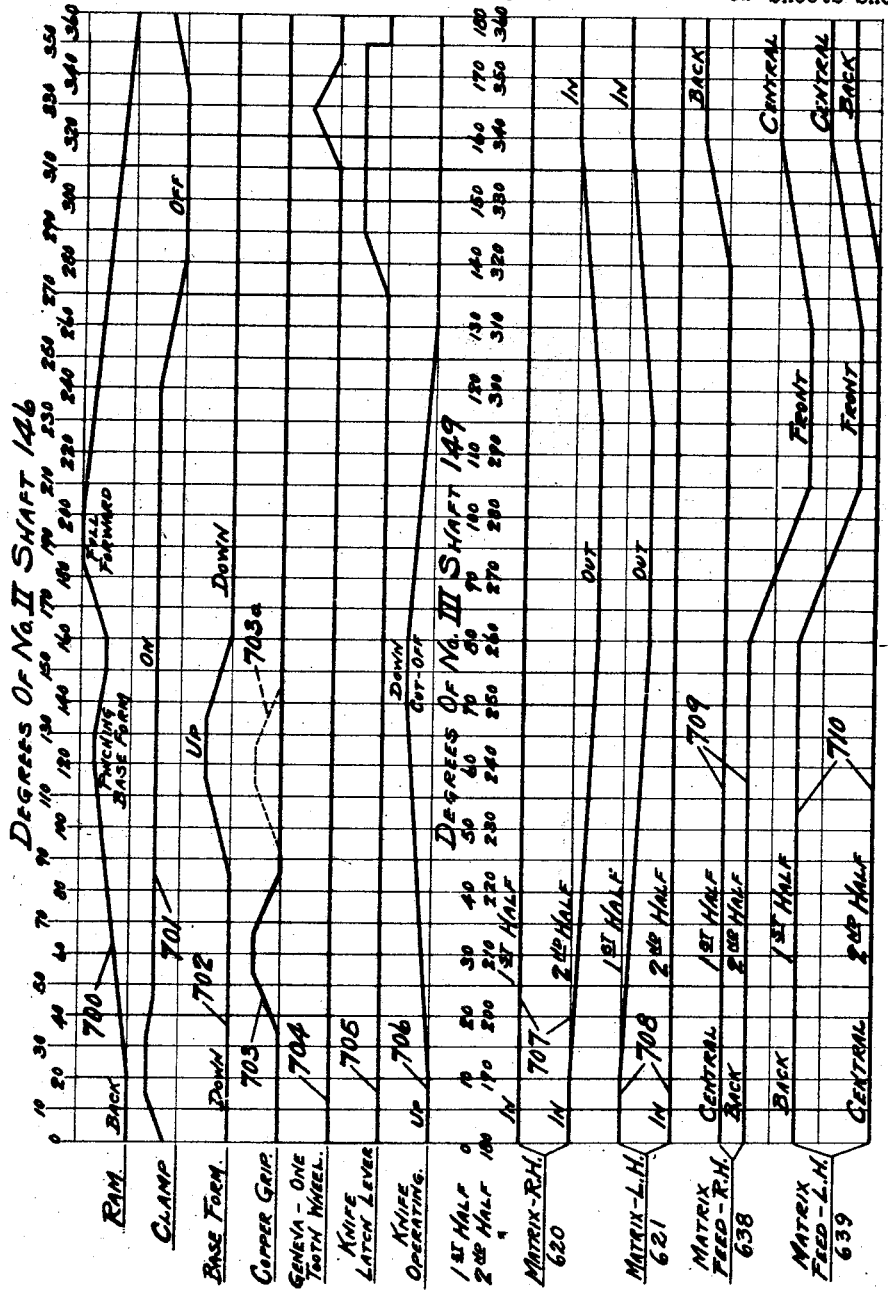

Fig. 55 is a front elevation of the matrix operating mechanism;

Fig. 56 is a plan view of the matrices, matrix carriages, platen, matrix back stop, positioning pawls and metal grips;

Fig. 57 is a view on the line 57—57 of Fig. 55;

Fig. 58 is a sectional view on the line 58—58 of Fig. 55;

Fig. 59 is a fragmentary perspective view of the free end of one of the matrices; and Fig. 60 is a cam timing chart.

The embodiment of the invention herein disclosed has been constructed especially for folding sheet material such as copper into a series of convolutions or fin loops shown at 100 in Fig. 2, this fin material being adapted to be secured permanently to the exterior of a cylindrical body such as an engine cylinder. Each fin loop has substantially parallel sides 101 and 102 joined by curved portion 103 at the outer edge of the fin. The adjacent portions 101 and 102 of adjacent loops merge into a base portion 104 which is substantially at right angles to the portions 101 and 102. When the fin material is assembled upon an engine cylinder the bases 104 are contiguous so that the cylinder is enveloped by substantially continuous sheet material, which is integral with the fin loops 100. It will be noted in Fig. 2 that the fins are not all the same height, height being the distance from the fin base to the outer portion 103. The reason for this is that it may be desirable to arrange the engine cylinders in pairs, the cylinders of each pair being spaced closer together than the spacing of the adjacent pairs of cylinders. Hence certain of the fin loops are made shorter than others to permit the close spacing referred to. Other fins such as 105 are made short to provide clearance for valve push rods which extend alongside of the cylinder.

Referring to Fig. 5 in which the operation of the mechanism is shown diagrammatically, the fin material indicated at A is caused to be clamped between a ram B and a metal grip C movable with the ram B. The parts B and C cause the metal A to be folded as indicated at A′ to provide a fin loop 100, one side of the loop being located against a matrix D which extends across the strip A. As viewed in Fig. 5, the lower edges of the sides of the fin loop where they join the fin bases are clamped between a base form E and the foot of the matrix D, and between the base form E and the ram B when at B′. During this part of the operation the matrix is held in position by matrix clamp F and by a back stop G. After forming a loop A′ the ram form B recedes from the matrix a short distance to permit withdrawal of the base form E to a position below the apron or platen H supporting the strip A. As the base form E is retracted, a base form stripper I prevents the fin base from being dragged below the level of the platen H. The ram B again approaches the matrix D to complete the folding operation and then recedes to the position shown in full line in Fig. 5.

Before the next folding operation is performed, a second matrix D′, which during the operation just described was located behind the matrix D is placed in front of the matrix D, so that the loop A′ is located between the two matrices.

After elevating the clamp F, and retracting the back stop G both matrices move together toward the rear of the machine until the location of the matrices is the reverse of that shown in Fig. 5. This movement of the matrices feeds the work J thru the machine, during which operation the grip C is released from the metal strip A. After the matrix D′ has exchanged places with the matrix D, the clamp F and the back stop G are moved into position so that lateral displacement of the matrix D′ will be resisted. The folding operation is repeated by the movement of the ram B and the metal grip C, engaging the metal A, toward the matrix D′ so as to form a second fin loop similar to the loop A′.

By means of an automatic timing mechanism, the instant during the travel of the ram B toward the matrix at which the metal is clamped to the ram B by the grip C is varied automatically so as to provide, in recurrent sequence, a series of fin loops varying in height from the fin bases. After each series of fin loops has been folded a knife K cooperating with a shear block L severs a completed series of fin loops from the first fin loop of the next series to be formed. As the metal A moves over the platen H along which the ram form B slides, the material A is held in position by spring-pressed clamp N. The metal passes between guides O each provided with a pivotally mounted jaw P for preventing accidental movement of the material A down the platen H.

*Gear trains from driving motor to the main cam operating shafts.*

The machine is supported by a frame 110 having a front wall 111, back wall 112, a right side wall 113, and a left side wall 114. The side frames 113 and 114 provide shelves 115 and 116 respectively which support cross frames 117 and 118. The front frame 111 provides a shelf 119 and the cross frame 118 provides a shelf 120. Shelves 119 and 120 support right and left intermediate frames 121 and 122. The sides 113 and 114 are provided with shelves 123 and 124 which support a motor base 125, carrying electric motor 126 and a gear housing 127. Motor 126 operates a shaft 128 which drives a gear 129 operating a gear 130 connected with a gear 131,—gears 130 and 131 being journalled on a shaft 132. Gear 131 operates a gear 133 loosely journalled on shaft 134 and provided with a clutch member 135 for cooperating with a companion clutch member 136 splined or keyed upon the shaft 134 for driving engagement therewith. The clutch element 136 is provided with a groove 137 for receiving the bifurcations 138 of a clutch shifting yoke 139.

When the clutch elements 135 and 136 are in engagement the motor will be mechanically connected with the clutch shaft 134 which is connected with a chain gear 140 connected by a chain or link belt 141 with an intermediate gear 142. Gear 142 is connected with a number I motor shaft 143 and drives thru gearing 144 and 145, the number II motor shaft 146. Shaft 143 drives thru gearing 147 and 148 the number III motor shaft 149. By means of an intermittent motion mechanism, to be described later, the shaft 146 operates a form cam shaft 150. These shafts 143, 146 and 150 are journalled by the frame sides 113 and 114 and the intermediate frames 121 and 122. The III motor shaft 149 is journalled by the cross frames 117 and 118.

*Manual clutch operating mechanism.*

The manually operable means for controlling the clutch member 136 includes a clutch control lever shaft 160 supported by the frame sides 111 and 112 and carrying levers 161 and 162. The lever 162 is provided with a spring-pressed plunger 163, which cooperates with recesses 162ª and 162ᵇ in plate 164 attached to the frame side 112 for the purpose of indexing the lever 162 in either "on" or "off" position of the clutch. The shaft 160 is attached by pin 165 to an arm 166 provided with a lug 167 projecting within one end of a spring 168 which fits over a lug 169 carried by a fork lever 170. Lever 170 is connected with a tube 171 which is loosely mounted on the shaft 160. The notched lever 170 receives a pin 172 carried by a lever 173, which is pinned to the clutch yoke shaft 174 carrying the clutch yoke 139. The gear case 127 supports all of the shafts 129, 132, 134 and 174.

The clutch member 136 is shown disconnected from the member 135. To connect these members, the lever 161 is moved counter-clockwise as viewed from the front of the machine, or the lever 162 is moved clockwise as viewed from the rear of the machine, so that the plunger 163 enters recess 162ª in order to move the lever 170 counter-clockwise and the lever 173 clockwise as viewed in Fig. 9. This causes the clutch member 136 to move to the left and engage the clutch member 135. From the shaft 160 motion is transmitted to the fork 170 thru the arm 166 and spring 168, thereby permitting over-travel of the levers 161 or 162.

*Automatic clutch disengaging device.*

The mechanism which operates automatically when the supply of strip metal is exhausted, for disconnecting the clutch member 136 from 135 includes the fork 170 and the tube 171 and a lever 180 attached to the tube 171 and connected by an adjustable link 181 with a shut-off pawl arm 182 loosely journalled on the shaft 150 and carrying a shut-off pawl 183 pivoted upon a stud 184 attached to the pawl arm 182. Pawl 183 provides an arcuate groove 185 which receives a pin 186 carried by a lever 187 which in turn is pinned to the trip arm shaft 188 loosely journalled by the left intermediate frame 122. The trip arm shaft 188 carries a trip arm 189 carrying a roller 190 for engaging upon the under side of the strip of sheet material A which is normally located between the roller 190 and a felt roller 191 of the strip lubricating device to be described later. The roller 190 is held against the strip A, or in the absence of the strip A, against the roller 191 by spring 192 attached to a bracket 193 carried by the frame side 111, and attached to a lever arm 194 carried by the trip arm shaft 188.

One of the cams 200 for operating the ram B (see Fig. 5) and to be described in detail later, is adapted to operate a lever 201 carrying a cam following roller 202. Lever 201 is loosely journalled upon the form cam shaft 150 and is provided with a lug 203 adapted to engage a shoulder 204 carried by the pawl 183 whenever this shoulder is in the path of movement of the lug 203. The roller 202 is held in engagement with the cam 200 by spring 205 attached by clip 206 and pin 207 to the intermediate frame 122 and by a clip 208 and a pin 209 to the lever 201.

While the machine is operating and there is a strip A between the rollers 190 and 191, the trip pawl 183 will be held in position shown in Fig. 12. The cam 200 which is driven by the number II motor shaft 146 will produce one oscillation of the lever 201 for each revolution of the shaft 146. While the pawl 183 is in the position shown in Fig. 12, this oscillation of the lever 201 will have no effect upon the clutch member 136. When the supply of stock A is exhausted so that there is none of it between the rollers 190 and 191, the spring 192 will move the roller 190 into the position shown in Fig. 13 thereby causing the lever 187 to move counter-clockwise in order to locate the shoulder 204 of the pawl 183 in the path of movement in the lug 203 of the lever 201. Consequently when the cam 200 moves the lever 201 into the position shown in Fig. 13 the link 181 will be moved downwardly to produce clockwise rotation of the sleeve 171 as viewed in Fig. 9. Consequently the fork 170 will cause the lever 173 to be moved downwardly thereby moving the clutch yoke 139 to the right, as viewed in Fig. 9, thereby causing the machine to stop. By reason of the spring connection 168 between the tube 171 and the shaft 160 the fork 170 may move clockwise to stop the machine automatically altho the shaft 160 and arm 166 may be moved into position for connecting the clutch elements 135 and 136.

Before rendering the machine operative again, shaft 160 is turned to clutch disengagement position, and a new strip of material A is introduced between the rollers 190 and 191 in order to restore the trip pawl 183 to the position shown in Fig. 12. Then the machine may be started manually by means previously described.

*Manually operable device for stopping the machine.*

The machine may be stopped manually at any time by moving the levers 161 and 162 to such position that the plunger 163 engages the recess 162ª (see Fig. 9). Movement in a clockwise direction causes the portion 166ª of the lever 166 to strike the lug 170ª and the lever 170 whereby to impart clockwise rotation to lever 170 and counter-clockwise rotation to the levers 173 and 139. This causes the clutch member 136 to be disengaged from the member 135.

*Stock oiler*

For supporting the stock A during its travel toward the matrices there is provided a platen 210, indicated at H in Fig. 5, and attached by screws 211 to the intermediate frame 122 and 121 as shown in Fig. 14. Screws 212 attached to the platen 210, the stock oiler bearing brackets 213, each notched to receive bushings 214 providing journals for the shaft ends 215 of a hollow stock cylinder 216 which is provided with a filler opening closed by plug 217. The stock oiler cylinder 216 is incased by sleeve 218 carrying felt rollers 191 and 191ª. Passages 219 are provided thru the cylinder 216 and the sleeve 218, to supply to the felt rollers 191 and 191ª lubricant indicated by the level line 220. Bearing bushings 214 are adjusted vertically by screws 214ª (see Fig. 14).

The stock oiler is readily removable from the brackets 213 and is secured in position by bearing hooks 221, each provided with a socket 222 for receiving the springs 223 located between the bottom wall of socket 222 and the lower end of a nut 224 which is received within the socket 222. The spring 223 surrounds a hook pin 225 which extends thru the bottom of the socket 222 and is provided with a head 226 connected by pins 227 to ears 228 extending from the bracket 213. The stock oiler hook 221 is provided with a handle 221ª and with a bearing gripping portion 221ᵇ which extends thru a notch 213ª provided by the bracket 213 and normally engages the bushing 214.

To release the stock oiler from the brackets 213 the hook handles 221ª are pulled upwardly until the portions 221ᵇ are clear of the brackets 213 so that the hooks may be rotated away from the brackets 213. This will permit hooks 221 to swing on their pins 227 away from the brackets. Then the stock oiler may be readily removed from the brackets for refilling with lubricant.

*Stock guides and back up preventing grips.*

As the stock A moved up the platen 210, it is guided by guide blocks 230 attached to the platen 210 and adjustable transversely thereof by means of bolts 231 cooperating with nuts 232, the square heads 233 of these bolts being received by a T slot 234 extending transversely of the platen 210. Each block 230 carries a stud 235 pivotally supporting a dog 236 provided with teeth 237. The teeth 237 are normally held in engagement with the stock A by means of a spring 238 attached to clips 239 and 240 connected, respectively, with the stud 241 attached to the block 230, and with a stud 242 attached to the dog 236.

It is obvious that the stock A may move up the platen 210 but cannot back down the platen because the teeth 237 would bite into the surface of the stock A to prevent such movement.

*Auxiliary sheet metal grip.*

In order to maintain the stock A in contact with the platen 210 and prevent buckling thereof when the ram B recedes from the matrix D, there is provided an auxiliary stock grip 250 carrying spring fingers 251, which engages the stock at 252, (see Fig. 14) the gripper 250 being rotatably mounted upon a shaft 253 connected with brackets 254 attached by screws 255 to the platen 210. The shaft 253 carries a collar 256 attached thereto by screws 257, and collar 256 is attached to one end 258 of a spring 259 having the other end bearing at 260 upon the grip 250.

*Ram and ram operating mechanism.*

The ram 270, indicated at B in Fig. 5, is connected by means of bolts 271 and a vertical adjusting bar 272 with a ram support 273. The support 273 rests upon shelves 274 and 275 provided by the ram arms 276 and 277 respectively, these arm being attached to a shaft 278 carried by the intermediate frames 121 and 122. In order to vary the distance between the ram 270 and the platen 210 the vertical adjusting bar 272 is provided with a tongue 279 and the ram 270 is provided with a cooperating groove 280, said tongue and groove being slightly oblique to the under surface of the ram, (see Fig. 18). The block 272 is provided with a tongue 281 and the support 273 with a cooperating groove 282, said tongue and groove being parallel to the under surface of the ram 270. The screws 271 pass thru slots 283 in the support 273, thru slots 284 in the adjusting block 272, and threadedly engage the ram 270. By moving the block 272 in a direction parallel to the platen 210 the distance between the ram and the platen may be varied to accommodate metal stock of different thickness. By tightening the screws 271 the ram 270 is held in adjusted position relative to the support 273.

Bolts 285 pass thru plain holes in the shelves 274 and 275 and thru slots 286 adjacent the ends of the ram support 273 and cooperate with nuts 287 to retain the support 273 upon the shelves. The ram arms 276 and 277 are provided with lugs 288 and 289 for receiving set screws 290 adapted to bear against support 273. In order to vary the distance between the ram 270 and the matrices the nuts 287 are loosened so that the support 273 may be adjusted along the shelves 274 and 275 thru the operation of the set screws 290. After this adjustment has been made the set screws are locked into position by nuts 291 and the nuts 287 are tightened on the bolt 285.

The mechanism for oscillating the ram arms includes the cam 200 which functions as a ram pinching cam as well as a cam for operating the automatic stop mechanism, a second ram pinching cam 300 in alignment with the cam 200 and a ram return cam 301. The ram arms 276 and 277 carry studs 302 and 303 supporting rollers 304 and 305 respectively. The rollers 304 and 305 cooperate with the cams 200 and 300. The ram arm 277 is provided with an extension 277ª carrying a stud 306 supporting a roller 307 which cooperates with a ram return cam 301. The ram cams are all mounted on the number II motor shaft 146 as shown particularly in Fig. 7. Mechanism to be described grips the stock A against the under surface of the ram and the operation of the machine causes the material to buckle between the ram and the exposed matrix as shown in Fig. 23.

*Metal grip and grip operating mechanism.*

The metal grip indicated at C in Fig. 5 is shown at 310, in the other views in which this element appears. Referrng particularly to Figs. 19, 20 and 21 there are three grips 310 each mounted on a grip shank 311 and secured by a screw 312. The grip shanks 311 are loosely journalled upon a grip shaft 313 rotatably supported by the ram arms 276, 277, retained at one end by collar 314 and carrying at the other end a grip operating lever 315.

The hub of each grip shank 311 is bifurcated to receive a lever 316 attached by pin 317 to the grip shaft 313. The lower end of each shank 311 is forked to receive the head 318 of a bolt 319 the head being attached to the shank 311 by pin 320. The bolt passes thru an aperture 321 in the lever 316 and receives a nut 322 having a spherical inner surface cooperating with a spherical cavity 323 provided by the lever 316. A spring 324 is located between a shoulder 325 on the rod 319 and between a nut lock washer 326 having fork arms 327 extending along each side of the lever 316 and having a resilient arm 328 provided with a ridge 329 adapted to engage one of the notches 330 provided by the nut 322. Considering the shaft 313 as a fixed member, adjusting the nut 322 will change the angular relation of the grip shank 311 to the shaft 313 and hence the normal location of the grip 310 relative to the ram 270, as shown in Fig. 22, can be varied. In this manner the yielding pressure applied to the metal A thru the spring 324 can be adjusted.

The grips 310 are held in non-operating position as shown in Fig. 22 or in operating position shown in Fig. 23 by mechanism which includes the grip operating lever 315 and a grip latch 331 carried by a shaft 332 which is rotatably supported by the ram arm 276. The latch 331 is provided with a wedge 333 adapted to be received by either of the two notches 334 provided by the lever 315. A spring 335 attached to a stud 336 on lever 315 and to a stud 337 on latch 321 tends to maintain the latch 331 and lever 315 in contact. The shaft 332 carries a grip release lever 338 which is actuated in a manner to be described in order to restore the position of the lever 315 and the latch 331 to that shown in Fig. 22.

The mechanism for operating the lever 315 includes a grip cam 340 attached to a hub 341 which rocks upon a shaft 342 supported by a bracket 343 attached to the frame side 114, said shaft 342 being supported also by the left intermediate frame 122 as shown in Fig. 10. The cam 340 is slotted to provide an operating surface 344 which cooperates with a roller 345 mounted on a stud 345ª carried by the lever 315. It is obvious that movement of the cam 340 to the left as viewed in Figs. 22 and 23 will cause the lever 315 to move clockwise from normal, shown in Fig. 22, to operating position shown in Fig. 23 to cause the grip 310 to pinch the metal strip A against the under surface of the ram 270. This operation will cause the wedge 333 of the grip latch 331 to be shifted from one notch 334 to the other notch in lever 315 as shown in Fig. 23. This operation will cause the grip 310 to be retained in gripping position altho the roller 345 may be relieved of operating pressure from the cam 340. When the lever 340 is in the position shown in Fig. 23, the surface 344 is concentric with the axis of the ram arm shaft 278, hence after the cam has been moved into the position mentioned, no further operation of the roller 345 will take place during the movement of the ram toward the matrix.

Since the height of the fin loop 100 is determined by the amount of material included between the foot of the exposed matrix and the foot of the ram 270 at the time the metal is gripped, it is obvious that the fin height may be varied by varying the instant during the movement of the ram toward the matrix at which the surface 344 of cam 340 engages the roller 345. The mechanism which operates the lever cam 340 therefore includes mechanism which can be adjusted automatically to vary the time of movement of the cam 340 relative to the cycle of operations of the machine.

The grip cam operating mechanism, shown more particularly in Figs. 22, 23 and 24, includes a bell crank lever 346 carrying a roller 347 engaging an arcuate surface 348 on the lever 340. When the lever is in grip operating position shown in Fig. 23 this surface is concentric with the number II motor shaft 146. The lever 346 carries a roller 348ᵇ cooperating with a cam 349 having a lobe shown at 350. In order to vary the time at which the lobe 350 strikes the roller 348ᵇ, the lever 346 is attached by a stud 351 to a floating pivot provided by a lever 352 loosely mounted on the shaft 346. A segment 353 is attached by screws 354 to the hub 355 of lever 352 and cooperates with a segment arm 356 threadedly mounted on a shaft 357 carried by bracket 358 attached by screws 359 to the frame front side 111.

It is obvious that moving the lever 356 up or down will rotate the floating pivot 352 relative to the cam 349.

The mechanism for controlling the up and down movement of the lever 356 includes a form cam 360 which is mounted on and driven by the form cam shaft 150 (see Fig. 7). Cam 360 cooperates with a cam follower 361 also pivoted upon the shaft 357 and adjustably secured to the lever 356 by means of a screw 362 passing thru a slot 363 in follower 361 and threadedly engaging the lever 356. The segment lever 356 is provided with an ear 364 receiving an adjusting screw 365 adapted to bear against the follower 361. The screw 365 is locked in position by nuts 366. The irregular contour of the cam 360 produces a range of variations in movements of the segment lever 356, the limit of this range being determined by the radii of the innermost surfaces $360^a$ and the outermost surfaces $360^b$ of the form cam. By adjusting the follower 361 relative to the segment lever 356, it is obvious that the range of variation of movements of lever 356 between the limits defined by the cam will not be changed but that the limiting positions of the lever 356 will be simultaneously raised or lowered. The result is that all of the metal loops 100 will be increased or decreased in height from the bases 104 the same amount, but the range of variation in height will be the same as before.

As stated before, the machine folds the material A into a periodically recurring series of metal loops. What this series is is determined by the shape of the cam 360. In order that the same machine may be adapted to fold different series of metal loops in recurrent sequence the cam 360 may be readily removed from the machine and another one substituted. To accomplish this result the cam 360 is mounted on a sleeve 370 provided with a knob 371 and with a journal portion 372 received by a bearing block 373 attached by a screw 374 to the bracket 343. The sleeve 370 provides a bearing for the form cam shaft 150. The form cam 360 is attached to a gear 375 and both cam and gear are provided with aligned holes so that when these elements are placed upon the sleeve 370 and the sleeve 370 is located upon the shaft 150 and extended thru the bearing block 373 as shown in Fig. 24, the cam 360 and the gear 375 will receive a pin 376 carried by an arm 377 connected with the shaft 150. The sleeve 370 is provided with a grooved portion 378 for receiving the arcuate lug 379 provided on a locking arm 380 having a handle 381 and a lug 382. In lug 382 is located in the path of movement of a lug 383 extending from the lever 356. When the lever 380 is moved upwardly by the handle 381 so as to clear the form cam 360 the lug 382 will strike the lug 383 and lift the cam follower 361 from the cam. Motion of the segment lever 356 is limited by lug 384 on said lever striking a lug 385 on the bracket 358. Therefore disengagement of the segments 356 and 353 is prevented.

When the bracket 373 has been detached from the bracket 343 and when the lever 380 is clear of the form cam 360, by grasping the knob 371, the sleeve 370 can be pulled away from the shaft 150 carrying with it a form cam 360 and gear 375. By removing the nuts $375^a$ which secures elements 360 and 375 to the sleeve 370, the elements 360 and 375 can be removed and others substituted. After assembling the sleeve 370 and bracket 343, the locking lever 380 is released, permitting it to fall in the position shown in Fig. 22, thereby preventing endwise movement of the sleeve 370.

A stud 30 on the grip cam hub 341 is connected with a clip 391 connected with a spring 392 connected with a clip 393 connected by pin 394 to a bracket 395 attached to the frame front side 111. A spring 396 is attached at one end by clip 397 to a stud 398 carried by the floating lever 352 and the other end is attached by a similar clip 397 to a stud 399 carried by the bracket 343. In this manner the roller $348^b$ is held yieldingly in engagement with the cam 349 and the roller 347 is held in engagement with the surface 348 of grip cam 340. The spring 396 urges the lever 352 clockwise, consequently, the segment is urged counter-clockwise yieldingly to press the cam follower 361 against the cam 360. In Fig. 22 the dotted dash circle $348^a$ and the dotted dash lever arm $346^a$ indicate the position of the floating bell crank 346 when in position for producing the formation of a high metal loop, such position being shown also in Fig. 23. If a short metal loop is to be formed the cam 360 will have permitted the dropping of the follower 361 and the segment arm 356 into the position shown in Fig. 22. This will cause the floating lever 346 to move into the position shown in Fig. 22, which also shows a difference in position of the roller $348^b$ for low and high metal loop formation. Since the cam 350, rotating with the shaft 146 clockwise, as indicated by arrow $350^a$ in Fig. 22, must rotate further from home position before striking the roller $348^b$ when located as shown in Fig. 22, then when located as shown in Fig. 23, it follows that the ram 270 will travel further toward the matrix before the grips 310 clamp the stock A against the ram 270. Hence a short metal loop will be formed when the mechanism is conditioned as shown in Fig. 22, whereas when the mechanism is conditioned as shown in Fig. 23, a metal loop of maximum height will be formed.

For each operation of the ram 270 the form cam 360 is given a partial revolution to bring the new surface into contact with the follower 361. If each series of metal loops includes 60 loops then the form cam will rotate once for every 60 oscillations of the ram, or one-sixtieth of a turn for each revolution of the number II motor shaft 146. A step by step intermittent motion is transmitted to the form cam shaft 150 by mechanism which includes a Geneva one-tooth gear 400 driven by the number II motor shaft 146 and operating intermittently a gear 401 located on a star wheel lock shaft 402 carrying a star wheel lock 403 cooperating with a locking hub 404 attached to the gear 400 and provided with a notch 405 for receiving the points of the star wheel 403. The gear 401 operates a gear 406 meshing with an intermediate gear 407 rotatably supported by a stud 408 carried by the bracket 343 and operating a gear 409 which drives a gear 410 in turn driving the gear 375. The gear 410 is mounted on a shaft 411 detachably secured by nut 412 to an idle gear support 413 which is pivotally mounted on the pivot stud 408. The idle gear support 413 is angularly adjustably secured to the bracket 343 by means of a bolt 414 extending thru a slot 415 in support 413 and thru a hole in bracket 343 and secured in clamping position by nut 416. Since the support 413 is adjustable the driving gear train between the shaft 146 and the gear 375 on shaft 150 may be adapted for the substitution of gears 375 varying in number of teeth. Since each revolution of the shaft 146 produces a movement of the gear 410 to a distance equal to the pitch of the teeth thereof, it is obvious that if a series of fifty instead of sixty material folds is desired then a gear 375 having fifty instead of sixty teeth is inserted in the machine and the support 413 is adjusted so as to connect the fifty-tooth gear 375 with the gear train.

*Base form and base form stripper.*

The base form shown at E in Fig. 5, is shown at 420 in Figs. 28 and 29 and includes two shanks 421 provided with dove tails 422 for engaging suitable notches in arms 423. The dove tails 422 are locked in position by keys 424, and the shanks 421 are secured to the arms 423 by plates 425, bolts 426 and nuts 427. The arms 423 are pivoted upon shaft 428 which as carried by an eccentric bushing 429 which is retained by screws 432'. The operating lever 430 is rotatably supported by the ram arm shaft 278 and carries a roller 433 which is received by the race 434 of the base form operating cam 435 which is connected with the number II motor shaft 146.

The base form stripper shown at I in Fig. 5 includes a stripper anvil 440 attached to a support 441 provided with arms 442 which are pivoted upon a rod 443 extending thru eccentric bushings 444 which may be clamped between the operating arm 430 and the clamps 431.

Referring to Figs. 32 and 33, as the ram 270 approaches that matrix which is nearest the ram, the cam 435 actuates the arm 430 from the position shown in Fig. 33 to that shown in Fig. 32 so that the base form 420 will be located above the lower surfaces of the ram and adjacent matrix as shown in Fig. 32. Therefore, when the ram 270 has been actuated to the position shown in Fig. 32, the material will be clamped between the foot of the matrix and the base form, and will be caused to bend at the edge 445 of the matrix. The material will be clamped also between the base form and the surface 270ª of the ram 270 (see Fig. 17) so that the material will bend at the edge 446 (see Figs. 17 and 32.)

The ram 270 recedes from the matrix slightly as shown in Fig. 33 to permit withdrawal of the base form from below the upper surfaces of the shear block L and the platen 210. As the ram recedes carrying with it metal grip 310, a spring 447 attached by clip 448 and screws 449 to arm 430 and by clip 450 and stud 451 to the base form arm 423, causes the base form 420 to press against the stripper 440, movement of the stripper 440 being limited either by the adjacent grips 310 or by engagement with the platen 210. The spring clip 450 is provided with an ear 452 bent under the arm 423 as shown in Fig. 28 in order to maintain the clip 450 in a position relative to the arm 423 as shown in Fig. 28. The pivots for the base form 420 and the base form stripper 440 are located so that the base form stripper has relatively little vertical movement while the base form may be pulled down below the upper surface of the stripper. Consequently, the stripper 440 provides a support for the sheet material which overhangs the platen 210 as shown in Fig. 32; and, when the base form 420 is retracted this material cannot follow the base form into the recess between the platen 210 and the shear block L.

The base form pivot shaft 428 extends into the path of movement of the grip release lever 338. When the mechanism is located as shown in Fig. 32 the parts 428 and 338 will not yet have been brought into engagement, therefore, the metal grip 310 is still in engagement with the stock A. At this time however, the cam lobe 350 has released the roller 348 so that the grip cam 340 has ceased to press upon the grip lever roller 345. Consequently, the grip is retained only by the grip latch 331 engaging the grip lever 315. While the ram 270 recedes slightly to permit withdrawal of the base form 420 the cam 435 actuates the lever 430 into the position shown in Fig. 33 causing the shaft 428 to be moved further to the right of shaft 278 than shown in Fig. 32. Therefore when the ram 270 approaches the exposed matrix again to complete the folding operation, the shaft 428 will engage the grip release lever 338 and will cause the grip latch 331 to move into the position shown in Fig. 33. As shown in this figure the grip 310 is released from the stock A, and is held in this position by the engagement of the wedge 333 of the grip latch 331 with the notch 334 nearest the free end of the lever 315.

Matrix clamp.

While the sheet material is being folded against the matrix is exposed to the ram, the matrix is clamped between the shear blocks L and the clamp F as shown in Fig. 5. Referring to Figs. 34 to 38 inclusive, and to Figs. 1 and 3, the machine frame 110 supports a table top or platform 460 to which are attached by screws 461, brackets 462 and 463 which are connected by a plate 464 attached by screws 465. The plate 464 provides ways 466 and 467, providing guides for the vertical movement of a matrix clamp slide 468. The slides 468 is provided with a surface 469 parallel to the matrices, said surface operating as a stop to limit the upward movement of a matrix gib 470 having an oblique lower surface 471 for engaging the oblique upper surface of the matrix clamp 472 indicated at F in Fig. 5. The gib 470 is moved in a direction parallel to the matrices by adjusting screws 473 which engage tapped holes in matrix back stop cams 475 which are attached by screws 476 to the matrix clamp slide 468. The adjusting screws 473 are retained by lock nuts 477. The horizontal adjustment of the gib 470 provides vertical adjustment of the matrix clamp 472. After adjusting the clamp 472 it is held in adjusted position by means of screws 478 which pass thru a vertically-slotted hole in the matrix clamp slide 476 and threadedly engage the matrix clamp 472.

Screws 480 attach to the slide 468 a block 481 connected by pin 482 with link 483 connected by pin 484 with lever 485 which is pinned to shaft 486. Shaft 486 is supported by a bracket 487 attached by screws 488 to the plate 464, and said shaft is supported by a bearing 489 provided by plate 464. At its outer end the shaft carries a lever 490 connected by pin 491 with link 492. Referring to Figs. 45 and 46, link 492 is connected by pin 493 with a clamp operating lever 494 provided with an aperture 495 for receiving the number II motor shaft 146. Lever 494 is pivoted on pin 496 supported by bracket 497 attached by screws 498 to cross frame 118. Lever 494 carries rollers 499 and 500 cooperating with clamp-operating cams 501 and 502 respectively, which are driven by the shaft 146.

Matrix back stop.

While the upper edge of the matrix is engaged by the clamp its lower edge or foot is restrained from movement away from the platen 210, when the material is being folded against the matrix by means of a back stop G in Fig. 5 and 510 in Figs. 34 to 44 inclusive. The back stop 510 slides vertically within recesses provided by the shear block 511 shown at L in Fig. 5. Block 511 is attached by screws 512 to the platform 460. The back stop 510 is connected by its shanks 513 and screws 514 to the arms 515 which are connected by pins 516 with a plurality of arms 517 extending from a shaft 518. The shaft 518 is provided with centrally-bored recesses 519 at each end thereof for receiving the pintles 520 extending centrally from the hubs 521 of the matrix back stop pawls 522. The hubs 521 and the shaft 518 are connected by tongue and groove connections indicated at 523 in Fig. 35, consequently, the hubs and shaft form in effect a continuous shaft having removable end pieces each providing a matrix back stop pawl 522. The frame 460 is provided with bosses 524 which are notched to provide bearings for the hubs 521 and thus prevent vertical displacement of the hubs 521 and shaft 518. Transverse movement of the shaft 518 and hubs 521 is prevented by the engagement of the matrix back stop cams 475 with the back stop pawls 522 and also by reason of engagement of the back stop 510 with the shear block 511. Endwise displacement of the shaft 518 and hubs 521 is prevented by the back stop cam 475 which moves up and down along the ends of the hubs 521.

When the matrix clamp 472 is located as shown in Fig. 34 the clamp slide 468 moves the back stop cams 475 into the position shown in Fig. 44, causing the back stop pawls to rotate counter-clockwise and the back stop 510 to be elevated above the top surface of the shear block 511. When the matrix clamp is elevated the back stop cams 475 will move to the positions shown in Fig. 43 to cause the back stop 510 to be retracted below the top surface of the shear block 511.

Matrix paralleling device.

In order to assure that the foot of the matrix will be located parallel with the back stop 510 there is provided a paralleling device which includes levers 530 pivoted on studs 531 attached by pins 532 to lugs 533 extending from a portion of the platform 460. Each lever 530 is provided with a finger 534 in the path of movement of the lug 535 provided by cam plate 536 which is attached by screws 537 to the ram arms 276 and 277. A spring 538 attached by clip 539 and screws 540 to the platform 460 and attached by a clip 541 and stud 542 to the lever 530 tends to maintain the finger 534 in engagement with the lug 535. The lever 530 is provided with a pin 543 located in the path of movement of the cam 536. Each lever 530 carries an adjusting screw 544 for engaging the matrix in order to position it parallel to the back stop 510, the screws 544 being locked in position by nuts 545. During the operation of the machine each matrix completes its travel under the matrix clamp just before the ram has reached the limit of travel away from the matrix. As the ram 270 approaches its limiting position remote from the matrix, the lugs 535 of cams 536 engage the fingers 534 in order to move the levers 530 and adjusting screws 544 into the position shown in Fig. 39. As the ram 270 moves into the position shown in Fig. 40 the lugs 535 release the fingers 534 and the levers 530 are moved into the position shown in Fig. 40 by the operation of the springs 538. In this position the levers 530 rest against the platen 210. This movement of the levers 530 is assisted also by the contact of cams 536 with the pins 543 in order to assure movement of the lever in case the springs 538 should break.

*Knife and knife operating mechanism.*

The knife indicated at K in Fig. 5 is designated by numeral 550 in Figs. 34 and 35. Knife 550 cooperates with the shearing edge 551 of shear block 511 and is secured by screws 552 to a knife operating slide or support 553 which slides in ways 554 provided by the plate 464. The slide 553 is retained by plates 555 secured to plate 464 by screws 556. Slide 553 is connected by pins 557 with links 558 attached by pins 559 to levers 560 connected with shaft 561. Shaft 561 is supported by brackets 462 and 463 and is attached to lever 562 connected by pins 563 with link 564. Lever 564 is connected by pin 565 with lever 566 which is integral with the hub 567 attached by pin 568 to a shaft 569 supported by the frame side 113 and by the right intermediate frame 121. Knife operating cams 570 and 571 are attached by pins 572 and 573 respectively to shaft 146 and cooperate respectively with rollers 574 and 575 carried by lever 576 rotatably supported by shaft 577 which is supported by the frame side 113 and the right intermediate frame 121. Lever 576 carries a key 578 which is adapted to be received by the notch 579 of a latch 580 which is pivoted by pin 581 carried by lever 582. Lever 582 is journalled on shaft 577 and is connected by pin 583 with a link 584 connected by pin 585 with an arm 586 integral with the hub 567.

Obviously if the key 578 should be received by the notch 579 of latch 580 and if latch 580 were released from connection with stationary parts, the lever 582 would oscillate with the lever 576 for each revolution of the shaft 146. But since the knife is operated only at the end of the formation of a series of metal folds to sever that series from the material in the machine, the knife is not operated every revolution of the shaft 146 but is operated periodically depending on the number of metal folds in the series. For example, if there be sixty folds in the series then the knife will be operated once during every sixty revolutions of the shaft 146. In order to maintain the latch 580 out of connection with the key 578 a latch is provided with a notch 590, engaged by a knife latch pawl 591, pivoted on stud 592, attached to frame side 113. A spring 593 attached by clip 594 and stud 595 to latch 580 and by clip 596 and bracket 597 to frame side 111, causes the latch to be maintained in engagement with the pawl 591. The latch 580 is provided with a lug 598 located in the plane of a shelf 599 integral with a flange 600 which is connected by screws 601 to the frame side 113. It is therefore apparent that with the parts located as shown in Fig. 47, movement of the latch 580 and the latch-supporting lever 582 is prevented. Therefore, the knife cannot be operated by the cams 570 and 571.

The location of the knife-operating mechanism as shown in Fig. 47 is shown diagrammatically in Fig. 51. In order to release the latch from connection with stationary parts, such as the shelf 599 and latch pawl 591, the form cam shaft 150 is provided with a knife latch pawl unlatching cam 603 provided with a lobe 604 which engages an arm 605 attached to the latch pawl 591. The engagement of parts 604 and 605, which is shown diagrammatically in Fig. 52, withdraws the pawl 591 from the notch 590 allowing the spring 593 to move the latch 580 away from the shelf 599 and to cause the notch 579 to receive the key 578. When this occurs the levers 576 and 582 will be connected so that the cams 570 and 571 will operate the knife 550 thru the mechanism which includes link 584, arm 586, hub 567, lever 566, link 564, lever 562, shaft 561, levers 560, links 558 and knife support 553.

In order to disconnect the levers 576 and 582 at the end of one oscillation of the knife 550 there is provided a knife latch lever cam 610 which is operated by shaft 146. A lever 611 pivoted on stud 612 attached to the frame side 113 is provided with a cam follower 613 maintained in engagement with the cam 610 by counterweight 614 integral with the lever 611. Lever 611 carries a finger 615 located in the path of movement of a pin 616 carried by the latch 580. The cam 610 moves the lever 611 into a position indicated diagrammatically in Fig. 51 by the dot and dash line position 611ª. When lever 611 has moved to this position, the finger 615 will engage the pin 616 at the time the lug 598 of lever 580 is in alignment with the shelf 599. The finger 615 therefore pushes the latch 580 counter-clockwise so that the notch 579 is retracted from the key 578 and the lug 598 rests on the shelf 599. The finger 615 moves the pin 616 far enough to permit the latch pawl 591 to fall into the notch 590. These operations restore the condition of the knife operating mechanism to that shown in Figs. 47 and 51.

It is apparent that the cam 603 could be provided with a plurality of lobes 604 in case it is desired to sever the metal a plurality of times during the revolution of the shaft 150.

In order to make adjustments for variations in manufacture so that the notch 579 of latch 580 may be brought into alignment with the key 578 when the lever 576 is at the limit of travel in a clockwise direction the lever 576 is provided with an arm 576ª carrying a screw 617 retained in adjusted position by a nut 618 bearing against a stop 619 carried by the lever 582.

*Matrix operating mechanism.*

The two matrices indicated at D and D' in Fig. 5 are shown at 620 and 621 in Figs. 55 and 56, and are mounted on carriages 622 and 623 which slide at right angles to the direction of motion of the ram 270. Each matrix carriage is provided with recesses for receiving springs 624 bearing against the under surface of a matrix tending to force its upper surface against a block 625 attached by screws 626 to the matrix carriages. Screws 627 passing thru slots 628 in the matrix threadedly engage the carriage and prevent lateral displacement of the matrix. Each matrix is therefore connected with its carriage in a manner permitting the slight vertical self adjustment. Each matrix includes a web portion 630, a head portion 631 and a foot 632. The foot portion 632 is used to form the bases of the material loops, and the head 631 is provided with a V-groove 633 for receiving the matrix clamp 472. The free edges of the matrices are bevelled to an edge 634 to facilitate introduction of the matrices between the metal folds.

The matrix carriages 622 and 623 are provided with dove tails 635 received by ways 636 and a gib 637 located on the matrix shifting carriages 638 and 639 respectively. The shifting carriages 638 and 639 are provided with dove tails 640 and 641 which are received by ways 642 and 643, respectively, provided by the platform 460. The matrix carriages and their shifting carriages are inclosed by housings 644 and 645.

Carriages 638 and 639 each carry a bracket 646 provided with a matrix guide plate 647 provided with an aperture 648 adapted to receive and laterally support a matrix. Each support 646 is provided with an aperture 649 for receiving one of the racks 650 and 651 connected respectively with the matrix carriages 622 and 623.

The matrix shifting carriages 638 and 639 are connected by adjustable links 652 and 653 with levers 654 and 655, respectively, which in turn are connected with shafts 656 and 657 and levers 658 and 659, respectively. Levers 658 and 659 each carry a roller 660 cooperating with a grooved cam 661 driven by the number III motor shaft 149. Shafts 656 and 657 are journalled in bearing brackets 662 supported by the cross frame 117.

The matrix carriages are shifted transversely to the motion of the ram 270 by mechanism which includes for the right-hand carriage 622, gear 670 meshing with rack 650, shaft 671, gear 672, segment lever 673 pivoted on shaft 674 and carrying rollers 675 and 676 which cooperate with cams 677 and 678 respectively. The shaft 674 is supported by the cross frames 117 and 118. The shaft 671 is supported by cross frame 118 and a bracket 679 attached to the shelf 115 of frame side 113.

The mechanism for transversely shifting the matrix carriage 623 includes a gear 680 meshing with rack 651, a shaft 681 connected with said gear and with a gear 682 meshing with a segment lever 683, pivoted on shaft 674 and carrying rollers 684 and 685 which engage, respectively, cams 686 and 687. Shaft 681 is journalled on cross frame 118 and a bracket 688 attached to shelf 116 extending from the frame side 114.

The cams 676, 677, 686 and 687 are all driven by the number III motor shaft 149. Since this shaft is driven at one-half the speed of the number I motor shaft 143 which operates at the same speed as number II motor shaft 146, it is apparent that shaft 146 will operate twice and two metal folds will be formed for each complete cycle of movements of the matrices, one fold being formed against the matrix 620 when located between matrix 621 and the ram 270, and the other fold being formed against the matrix 621 when located between the matrix 620 and the ram 270.

*Summary of machine operation.*

Referring to Fig. 60 curve 700 represents the movements of the ram 270, curve 701 the movements of the clamp 472, curve 702 the movements of the base form 420, curve 703 the movements of the metal grip 310, curve 704 the intermittent movement of the form cam shaft 150 produced by the Geneva one-tooth gear 400, curve 705 the movements of the knife latch lever 610 and curve 706 the movements of the knife 550. These curves are all plotted on degrees of rotation of the number II motor shaft 146.

Curve 707 represents the endwise movements of the matrix 620, curve 708 the endwise movements of the matrix 621 and curves 709 and 710 indicate respectively the sidewise movements of the matrices 620 and 621, or the movements of their feed carriages 638 and 639. The curves 707 and 710 are plotted on degrees of revolution of the number III motor shaft 149. The first half revolution of shaft 149 will occur during one revolution of the shaft 146, and the second half revolution will occur during the subsequent revolution of shaft 146.

Assuming that the right-hand matrix 620 is "in" or located across the stock A and under the clamp 472, at about 10 degrees revolution of shaft 146 the clamp engages the matrix 620. At 20 degrees the ram starts to move toward the matrix and between 120 to 130 degrees the ram pinches the stock against the matrix and against the base form, the base form being up between 115 and 135 degrees. Since the clamp is in engagement with the matrix, the matrix back stop is up as long as the clamp is "ON". The ram 270 begins to recede slightly at 130 degrees and ceases at 150. At about 135 degrees the base form starts to move down and reaches the downward position at 160 degrees, at which time the ram starts to move forward toward the matrix 620 and reaches the full forward position completing the folding operation at about 185 degrees. The ram starts to recede finally at 200 degrees and completes its movement at the end of one revolution of shaft 146. From 240 degrees to 280 degrees the clamp recedes from the matrix and remains disengaged until about 335 degrees when it begins to move toward the matrix again.

The operation of the metal grip is variable and the gripping may take place during the movement of the ram toward the matrix at any time between the limits of about 50 degrees and 110 degrees. In the chart the full line indicates the timing of the copper grip for the longest metal fold and the curve 703ª indicates the timing for the shortest fold. The release of the metal grip occurs always at the same time, namely, about 180 degrees of movement of shaft 146.

It will be noted that the operation of the shaft 150 by the Geneva one-tooth wheel takes place while the knife latch lever is operating to restore the knife latch and disconnect the knife from its operating mechanism and these movements all take place while the knife operating cam maintains the lever 576 in the position shown in Figs. 47 and 51. The knife is operated while the clamp is on the matrix thereby tending to prevent the work from shifting while being severed.

During the cycle of operations produced by the first revolution of shaft 146 the right-hand matrix 620 remains in, and its feed carriage 638 remains central, causing the matrix to be located under the clamp. While matrix 620 is stationary the left-hand matrix 621, which is initially "in" or between the metal folds and back of the matrix 620, begins at 20 degrees of revolution of shaft 146 to move and completes its travel at 160 degrees. At this instant the left-hand matrix feed or shifting carriage 639 moves in front of the right-hand matrix feed carriage and stays there until 260 degrees of rotation of shaft 146. At 230 degrees the matrix 621 begins to move in toward the work and at 260 degrees the matrix 621 is continuing its movement across the work while the feed carriage 639 begins moving toward central position. While the left-hand matrix carriage 639 is moving into central position from front position the right-hand matrix feed carriage 638 begins to move at 280 degrees, when the clamp is off, from central to back position. As both matrices move toward the rear of the machine they carry along the stock A, a distance about equal to the distance between adjacent folds of the stock. At this time of course the clamp is off and the base form and back stop are retracted.

It is therefore apparent that the relative location of the two matrices is reversed at the end of the first revolution of the shaft 146 or at the end of a half revolution of shaft 149. During the next revolution of shaft 146, the functions defined by curves 700 to 706 may take place and the movements of the matrices are such as to reverse their positions again at the end of one complete revolution of the shaft 149. While matrix 621 is under the clamp the matrix 620 moves out or away from the work and its feed carriage 638 begins at 160 degrees revolution of shaft 146 or 260 degrees of shaft 149 to move in front of the left-hand matrix feed carriage 639, which is then in central position. While the matrix 620 is moving in again toward the work the right-hand matrix feed carriage 638 begins at 260 degrees revolution of shaft 146 or 310 of shaft 149 to move from front towards central position. While this is going on the left-hand matrix feed carriage begins at 280 degrees revolution of shaft 146 or 320 of shaft 149 to move from central position toward back position. By the time the matrix carriages have moved toward the rear of the machine, at 320 degrees revolution of shaft 146 and 340 degrees revolution of shaft 149, the right-hand matrix 620 will be moved fully to "in" position. Hence the matrices have changed places again and their relative location is the same as that at the beginning of the complete cycle of operation of the machine.

Referring to the curve 701 representing the operations of the clamp, it will be noted that between 15 and 35 degrees the clamp is located further from "Off" position or base line than between 45 and 240 degrees. This curve represents that, between 15 and 35 degrees of revolution of shaft 146, the material between the foot of the matrix and the shear block is given an extra squeeze during which time all of the lost motion of the joints of the mechanism is taken up. After the material has been firmly squeezed against the shear block pressure on the apparatus by the clamp cam is relieved. However, between 45 and 240 degrees the matrix is still engaged by the clamp, altho the pressure between the foot of the matrix and the material has been somewhat relieved.

As the work moves backwardly, it is guided by surfaces 730 of bars 731 attached to the brackets 462 and 463 by screws 732, and also by angles 733 attached to bars 731. The spaces 734 (see Fig. 56) between the angles 733 and the bars 731, received the knife 550 during its movement relative to the work.

By means previously described, the ram 270 can be adjusted into parallelism with the back stop 510. While the clamp is off, between 280 degrees and 335 degrees of rotation of shaft 146, the paralleling device is operated by movement of the matrix to move the matrix away from parallelism with the back stop and, into parallelism with the back stop and, consequently, the ram. This operation positively insures the correct placing of the matrix before being clamped against the sheet metal. Therefore, the abrupt bends in the metal will be parallel to each other.

In the claims which follow, the term "die portions", refer to the matrix and the ram which cooperate to provide a die within which the sheet metal is folded. The base form constitutes a "die member" which is inserted between the other die portions to form the bases connecting the metal loops. The metal clamping means includes the shear block 511 and the matrix between which the metal is clamped by the action of the matrix clamp 472.

While the form of embodiment of the invention as herein disclosed constitutes a preferred form, it is to be understood that other forms might be adopted, all coming within the scope of the claims which follow.

We claim:

1. A machine for folding sheet material comprising, in combination, means for forming a strip of sheet material into folds; means severing a predetermined series of folds from said strip of material; and means for automatically stopping the machine when the material remaining unfolded is shorter than that required for forming a complete series of folds.

2. A machine for folding sheet material comprising, in combination, means for forming a strip of sheet material into a series of folds in recurrent sequence; means for automatically severing each series from the remaining unfolded strip; and means for automatically stopping the machine when the material remaining unfolded is shorter than that required for forming a complete series or folds.

3. A machine for folding sheet material comprising, in combination, means for clamping the material; a ram cooperating with the clamping means to form a fold; means for supplying between the ram and the clamp the material required to complete a fold; a motor for driving the machine; a clutch connecting the motor and the machine; means for moving the ram; and means rendered operative by the decrease of unfolded material to a certain length, and actuated by the ram moving means, for disengaging the clutch.

4. A machine for folding sheet material comprising, in combination, means for clamping the material; a ram cooperating with the clamping means to form a fold; means for supplying between the ram and the clamp the material required to complete a fold; a motor for driving the machine; a clutch connecting the motor and the machine; means for moving the ram; and means rendered operative by the decrease of unfolded material to a certain length, and actuated by the motor for disengaging the clutch.

5. A machine for folding sheet material comprising, in combination, means for clamping the material; a ram cooperating with the clamping means to form a fold; means for supplying between the ram and the clamp the material required to complete a fold; means for moving the ram; a platen which supports the strip of material as it is supplied to the machine, and over which the ram moves; and means for adjusting the distance between the ram and platen to provide for sheet material of different thicknesses.

6. A machine for folding sheet material comprising, in combination, means for clamping the material; a ram cooperating with the clamping means to form a fold; means for supplying between the ram and to clamp the material required to complete a fold; means for moving the ram; a platen which supports the strip of material as it is supplied to the machine, and over which the ram moves; and means for varying the minimum distance between the ram and clamp to suit sheet material of different thicknesses.

7. A machine for folding sheet material comprising, in combination, means for clamping the material; a ram cooperating with the clamping means to form a fold; means for supplying between the ram and the clamp the material required to complete a fold; means for moving the ram; a platen which supports the strip of material as it is supplied to the machine, and over which the ram moves; means for adjusting the distance between the ram and platen; and means for varying the minimum distance between the ram and clamp to suit sheet material of different thicknesses.

8. A machine for folding sheet material comprising, in combination, sheet material clamping means including a die portion; a cooperating movable die portion; means for gripping the sheet material against the movable die portion including a spring pressed member; and means for regulating the pressure exerted by said spring pressed member.

9. A machine for folding sheet material comprising, in combination, a matrix providing a die portion; a movable ram cooperating with the matrix to form a fold of sheet material; a movable carriage for moving the matrix across the sheet material; a clamp for engaging the matrix and pressing it against the sheet material; and means for yieldingly supporting the matrix by the matrix carriage whereby the clamping means may move the matrix independently of the matrix carriage.

10. A machine for folding sheet material comprising, in combination, a matrix providing a die portion; a movable ram cooperating with the matrix to form a fold of sheet material; a movable carriage for moving the matrix across the sheet material; and means for rendering the matrix parallel to the ram.

11. A machine for folding sheet material comprising, in combination, a matrix providing a die portion; a movable ram cooperating with the matrix to form a fold of sheet material; a movable carriage for moving the matrix across the sheet material; a clamp for engaging the matrix and pressing it against the sheet material; and means for rendering the matrix parallel to the ram.

12. A machine for folding sheet material comprising, in combination, a matrix providing a die portion; a movable ram cooperating with the matrix to form a fold of sheet material; a movable carriage for moving the matrix across the sheet material; a back stop receiving pressure from the matrix as the sheet material is folded between the matrix and the ram; and means for rendering the matrix parallel to the back stop after the carriage has moved the matrix to operating position adjacent the sheet material.

13. A machine for folding sheet material comprising, in combination, a matrix providing a die portion; a movable ram cooperating with the matrix to form a fold of sheet material; a movable carriage for moving the matrix across the sheet material; a back stop receiving pressure from the matrix as the sheet material is folded between the matrix and the ram; means for adjusting the ram into parallelism with the back stop; and means for rendering the matrix parallel to the back stop after the carriage has moved the matrix to operating position adjacent the sheet material.

14. A machine for folding sheet material comprising, in combination, a matrix providing a die portion; a movable ram cooperating with the matrix to form a fold of sheet material; a back stop receiving pressure from the matrix as the sheet material is folded between the matrix and the ram; means for rendering the matrix parallel to the back stop; and means for clamping the matrix in operating position.

15. A machine for folding sheet material comprising, in combination, cooperating die portions for forming a fold; means for moving one of the die portions; means for supplying sheet material to the die portions; another die member movable between the die portions; and means for stripping the sheet material from said other die member when retracted from location between the first mentioned die portions.

16. A machine for folding sheet material comprising, in combination, a matrix and a ram constituting die portions between which sheet material is folded; means for supplying sheet material between the matrix and the ram; means for moving the ram toward and from the matrix; a die member movable between the matrix and the ram and cooperating therewith to form the material; and means for preventing the material following the die member when retracted from location between the ram and matrix.

17. A machine for folding sheet material comprising, in combination, cooperating die portions for forming a fold; means for moving one of the die portions; means for supplying sheet material to the die portions; means for stopping the machine automatically when the strip of unfolded material being supplied to the machine has decreased to a certain length; and means for stopping the machine manually.

In testimony whereof we hereto affix our signatures.

CHARLES L. LEE.
THOMAS C. VAN DEGRIFT.